(12) United States Patent
Savov et al.

(10) Patent No.: US 10,353,752 B2
(45) Date of Patent: Jul. 16, 2019

(54) METHODS AND APPARATUS FOR EVENT-BASED EXTENSIBILITY OF SYSTEM LOGIC

(71) Applicant: VMware, Inc., Palo Alto, CA (US)

(72) Inventors: Boris Savov, Sofia (BG); Igor Stoyanov, Sofia (BG); Rostislav Georgiev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 224 days.

(21) Appl. No.: 15/371,545

(22) Filed: Dec. 7, 2016

(65) Prior Publication Data

US 2018/0157542 A1    Jun. 7, 2018

(51) Int. Cl.
| G06F 9/54 | (2006.01) |
| G06F 9/445 | (2018.01) |
| G06F 9/46 | (2006.01) |
| G06F 8/60 | (2018.01) |
| H04L 29/06 | (2006.01) |
| G06F 9/455 | (2018.01) |
| H04L 29/08 | (2006.01) |

(52) U.S. Cl.
CPC .............. G06F 9/542 (2013.01); G06F 8/60 (2013.01); G06F 9/45558 (2013.01); G06F 9/46 (2013.01); H04L 67/38 (2013.01); H04L 67/10 (2013.01)

(58) Field of Classification Search
None
See application file for complete search history.

(56) References Cited

U.S. PATENT DOCUMENTS

| 8,171,485 | B2 | 5/2012 | Muller | |
| 2008/0320441 | A1* | 12/2008 | Ahadian | G06F 8/24 717/108 |
| 2013/0232480 | A1* | 9/2013 | Winterfeldt | G06F 8/60 717/177 |
| 2013/0304788 | A1* | 11/2013 | DeLuca | G06F 8/61 709/201 |
| 2014/0181816 | A1 | 6/2014 | Muller et al. | |
| 2015/0186132 | A1* | 7/2015 | Oliveri | G06F 8/34 717/120 |
| 2017/0083292 | A1* | 3/2017 | McLaughlan | G06F 8/34 |

OTHER PUBLICATIONS

Bijjahalli, "vRealize Automation 7.0—New Event Broker Enhances Lifecycle Extensibility", Nov. 2, 2015, 4 pages.
United States Patent and Trademark Office, "Non-Final Office Action," issued in connection with U.S. Appl. No. 15/371,450, dated Mar. 30, 2018, 14 pages.
United States Patent and Trademark Office, "Notice of Allowance," issued in connection with U.S. Appl. No. 15/371,450, dated Jul. 30, 2018, 9 pages.
Silesh Bijjahall, "vRealize Automation 7.0—New Event Broker Enhances Lifecycle Extensibility," VMware Inc., Nov. 2, 2015, 4 pages.

* cited by examiner

*Primary Examiner* — Umut Onat
(74) *Attorney, Agent, or Firm* — Hanley, Flight & Zimmerman, LLC

(57) ABSTRACT

Methods and apparatus to customize deployment are disclosed. An example deployment customization manager can generate a first notification payload including an uncustomized application component property of an application component that provides a logical template of an application. A deployment event broker can reply back to the deployment customization manager with another payload that includes a customized or modified application component property.

19 Claims, 21 Drawing Sheets

METHODS AND APPARATUS FOR EVENT-BASED EXTENSIBILITY OF SYSTEM LOGIC

FIELD OF THE DISCLOSURE

The present disclosure relates generally to cloud computing and, more particularly, to methods and apparatus to provide event-based extensibility of system logic in deployment provisioning.

BACKGROUND

Virtualizing computer systems provide benefits such as the ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Figure 1A:
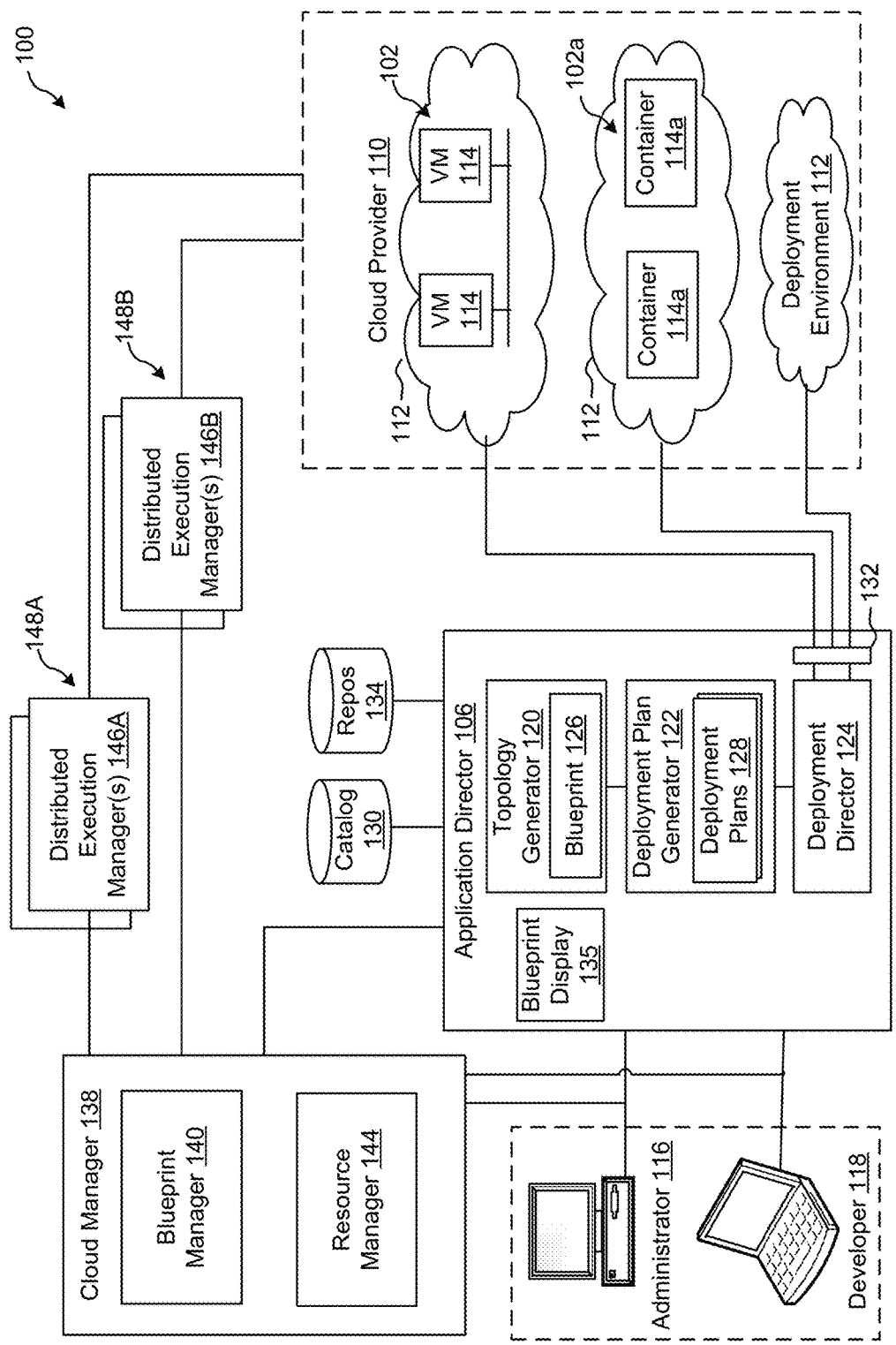
FIGS. 1A-1C depict an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vRealize Orchestrator (vRO) from VMware®, the vRealize Automation Cloud Automation Software from VMware®), interfaces, portals, etc. disclosed herein may be utilized individually and/or in any combination. For example, all or a subset of the described improvements may be utilized.

As used herein, "availability" refers to the level of redundancy required to provide the continuous operation expected for the workload domain. As used herein, "performance" refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, "capacity" refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full "virtualization", as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

"Paravirtualization", as used herein, is a virtualization environment in which hardware resources are managed by a hypervisor to provide virtual hardware resources to a virtual machine, and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

"Operating system virtualization" is also referred to herein as container virtualization. As used herein, "operating system virtualization" refers to a system in which processes are isolated in an operating system. In a typical operating system virtualization system, a host operating system is installed on the server hardware. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Figure 1B:
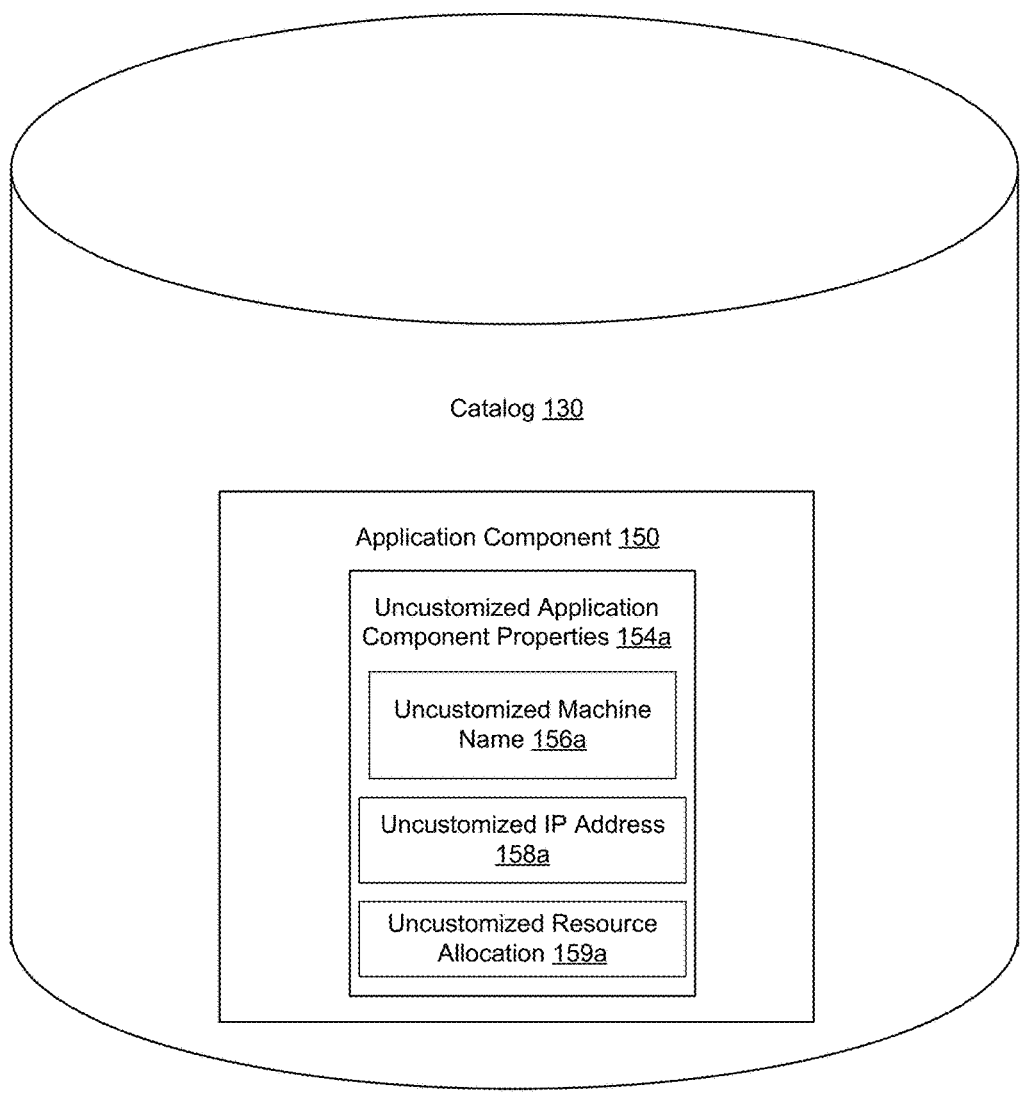
Figure 1C:
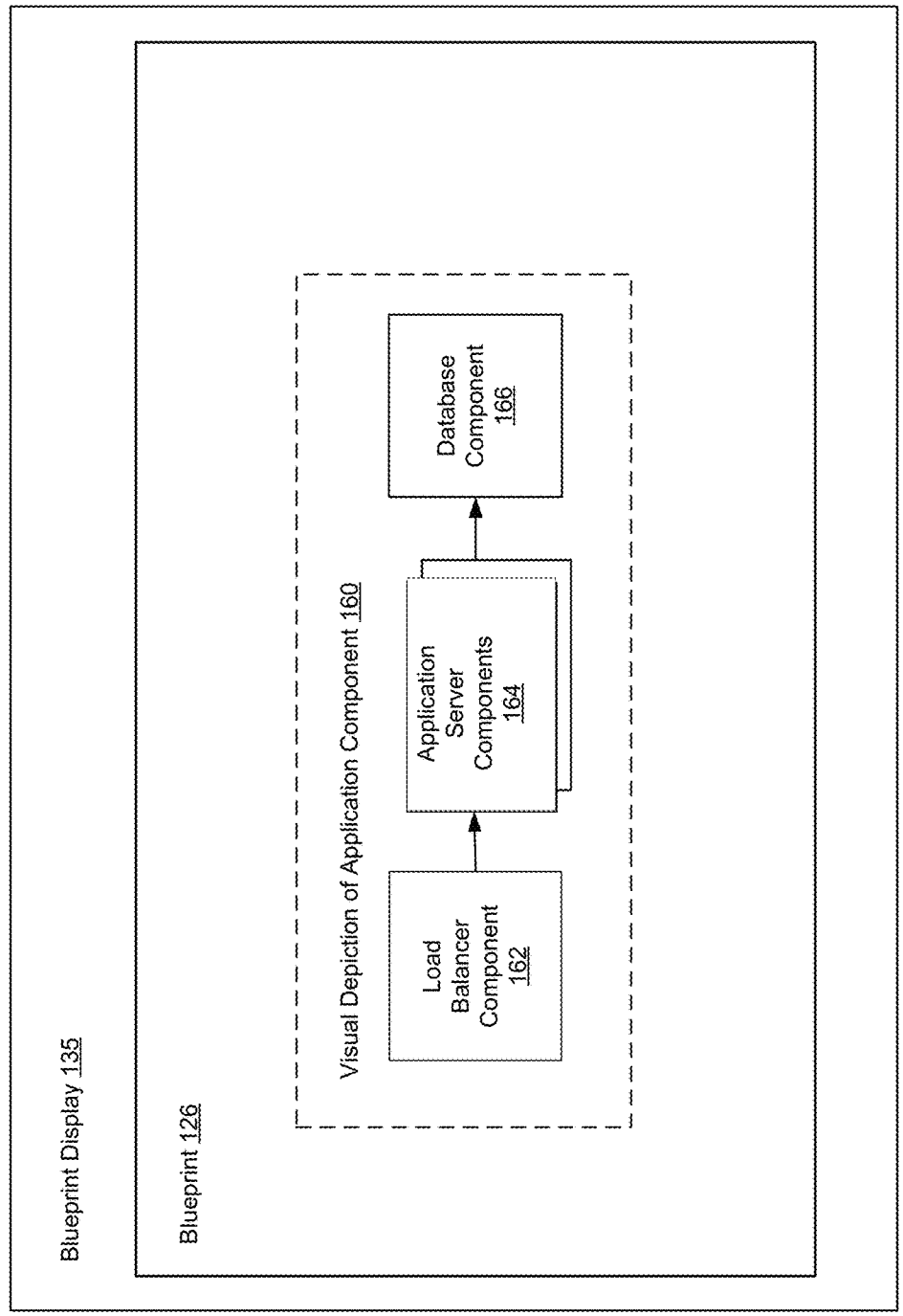

FIGS. 1A-1C depict an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device, etc.

An example application 102 of FIG. 1A includes multiple VMs 114. The example VMs 114 of FIG. 1A provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies one or more other ones of the VMs 114.

As illustrated in FIG. 1A, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vRealize Orchestrator (vRO) and/or vRealize Automation (vRA) API and a vCloud Director API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112A of FIG. 1A is vCloud DataCenter cloud computing services available from VMware, Inc.

In some examples disclosed herein, a lighter-weight virtualization is employed by using containers instead of VMs 114 as shown in the development environment 112B. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112B.

The example application director 106 of FIG. 1A, which may be running in one or more VMs, orchestrates deployment of multi-tier applications onto one of the example deployment environments 112A, 112B, 112C. As illustrated in FIG. 1A, the example application director 106 includes a topology generator 120, a deployment plan generator 122, and a deployment director 124.

The example topology generator 120 generates a basic blueprint 126 of FIG. 1A that specifies a logical topology of an application to be deployed. The example basic blueprint 126 generally captures the structure of an application as a collection of application components executing on virtual computing resources. An example online store application basic blueprint 126 generated by the example topology generator 120 may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including of one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1A may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. FIG. 1B shows a more detailed view of example catalog 130, explicitly showing for example Application Component 150 including Uncustomized Application Component Properties 154a, which for example can include an Uncustomized Machine Name 156a, a reservation for an Uncustomized Internet Protocol (IP) Address 158a, and an Uncustomized Resource Allocation 159a. The forgoing are related to VM's. For example, the Uncustomized Resource Allocation 159a can be broadly directed to examples such as uncustomized Central Processing Unit (CPU) allocation for VM's, and uncustomized memory allocation for VM's, etc. As will be discussed in greater detail subsequently, the Uncustomized Application Properties can be customized and/or modified so as to provide for deployment customization.

More generally, the example catalog 130 may be prepopulated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1A generates a deployment plan 128 based on the basic blueprint 126 that includes deployment settings (e.g., virtual computing resources' cluster size, CPU, memory, networks, etc.) and an execution plan of tasks. The execution plan specifies an order in which virtual computing resources are provisioned and application components are installed, configured, and started. The example deployment plan 128 of FIG. 1A provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112A, 112B. 112C, etc. (e.g., for testing, staging, production). In this example the deployment plan 128 is separated and distributed as a series of local deployment plans having a series of tasks to be executed by the VMs 114 provisioned from the deployment environment 112A. Each VM 114 coordinates execution of each task with a centralized deployment module (e.g., the deployment director 124) to ensure that tasks are executed in an order that complies with dependencies specified in the application blueprint 126. The Application Director 106 can generate a Blueprint Display 135, as shown in FIG. 1A and as shown for example in greater detail in FIG. 1C. In the example of FIG. 1C, the Blueprint Display 135 displays an example Blueprint 126 showing for example a Visual Depiction of Application Component 160. In the example of FIG. 1C, the Application Component includes an example Load Balancer Component 162 topologically coupled with example Application Server Components 164 topologically coupled with Database Component 166.

The example deployment director 124 of FIG. 1A executes the deployment plan 128 by communicating with the cloud computing platform provider 110 via a cloud interface 132 to provision and configure the VMs 114 in the deployment environment 112A and/or containers 114a in the deployment environment 112B. The example cloud interface 132 of FIG. 1A provides a communication abstraction layer by which the application director 106 may communicate with a heterogeneous mixture of cloud provider(s) 110 and/or deployment environments 112A, 112B, 112C, etc. The deployment director 124 provides each VM 114 and/or Containers 114A with a series of tasks specific to the receiving VM 114 and/or Containers 114A (herein referred to as a "local deployment plan"). Tasks are executed by the VMs 114 and/or Containers 114A to install, configure, and/or start one or more application components. For example, a task may be a script that, when executed by a VM 114 and/or Containers 114A, causes the VM 114 and/or Containers 114A to retrieve and install particular software packages from a central package repository 134. The example deployment director 124 of FIG. 1A coordinates with the VMs 114 and/or Containers 114A to execute the tasks in an order that observes installation dependencies between VMs 114 and/or Containers 114A according to the deployment plan 128. After the application has been deployed, the application director 106 may be utilized to monitor and/or modify (e.g., scale) the deployment.

The cloud manager 138 of FIG. 1A interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1A additionally annotates basic blueprints and/or multi-machine blueprints to control how workflows associated with the basic blueprints and/or multi-machine blueprints are executed. A "workflow" as used herein is a series of actions and decisions to be executed in a virtual computing platform. The example system 100 of FIG. 1A includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 of FIG. 1A annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
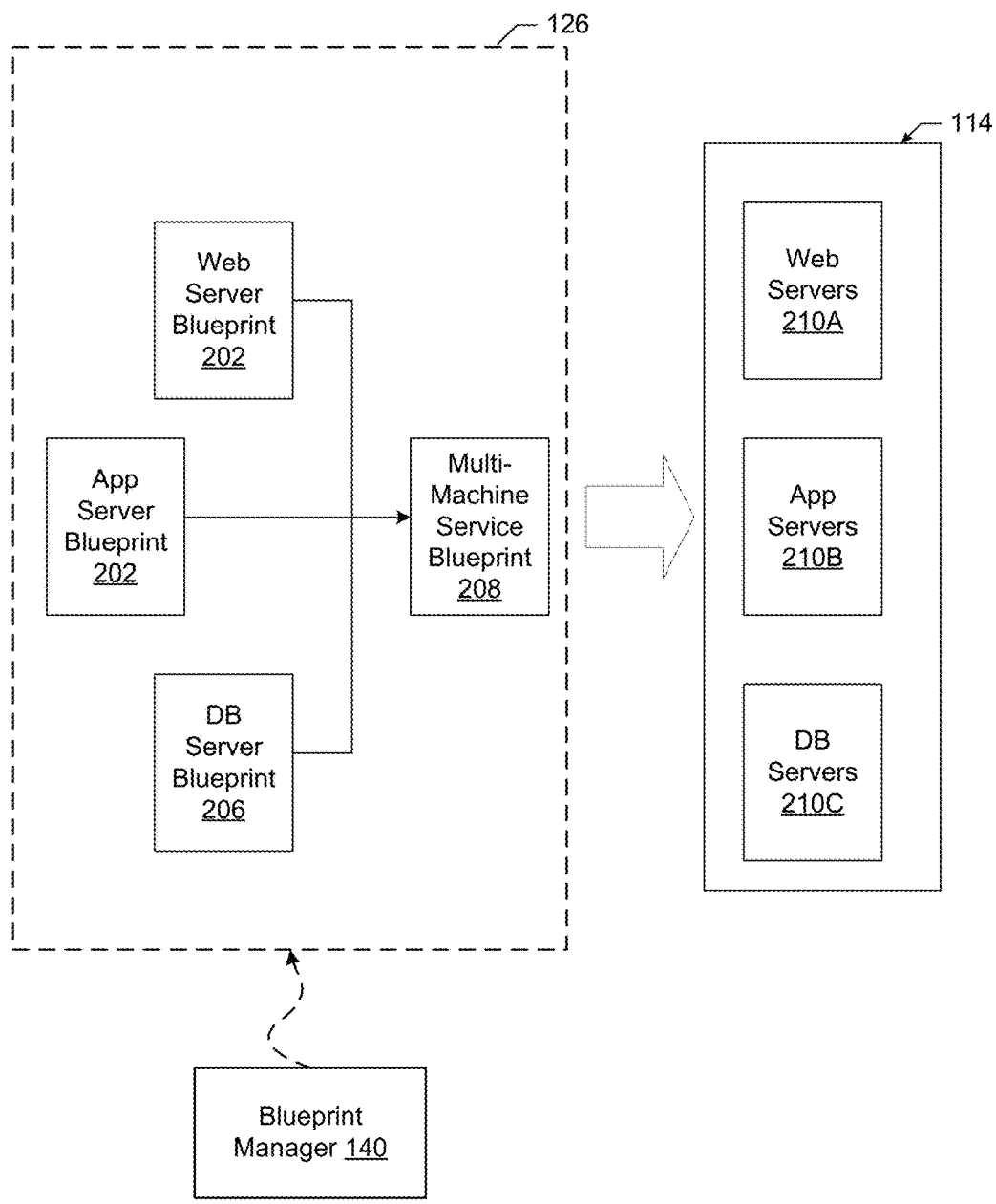
FIG. 2 illustrates an example generation of a multi-machine blueprint by the example blueprint manager of FIG. 1A.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint 210. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one of one or more varied or customized services. For example, if virtual machines deployed in the various States of the United States require different settings, a multi-machine blueprint could be generated for each such state. The multi-machine blueprints could reference the same build profile and/or disk image, but may include different settings specific to each state. For example, the deployment workflow may include an operation to set a locality setting of an operating system to identify a particular State in which a resource is physically located. Thus, a single disk image may be utilized for multiple multi-machine blueprints reducing the amount of storage space for storing disk images compared with storing a disk image for each customized setting.

Figure 3:
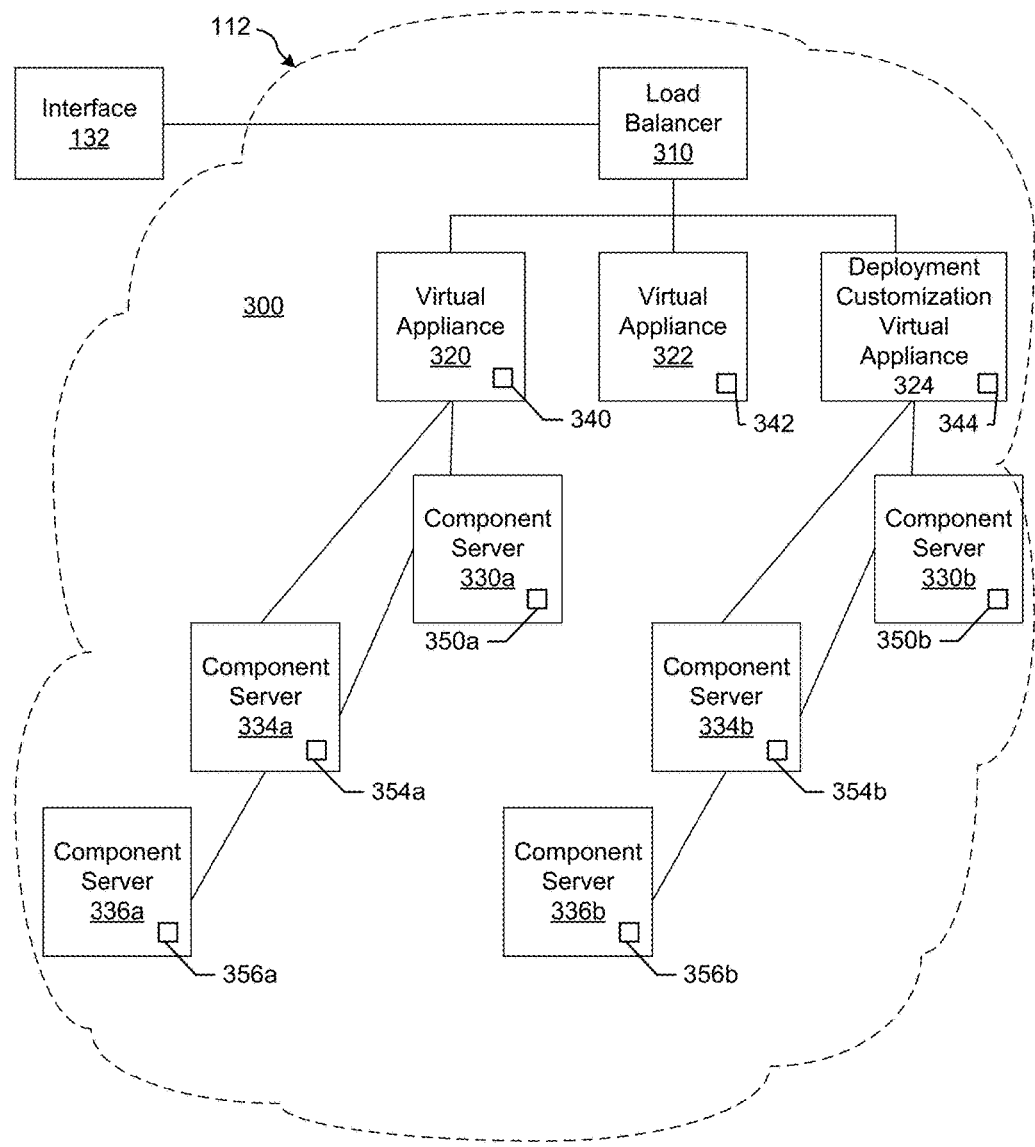
FIG. 3 illustrates an example installation of deployed virtual machines and associated servers acting as hosts for deployment of component servers for a customer.

FIG. 3 illustrates an example installation of deployed appliances or virtual appliances (vAs) (e.g. VMs 114 and or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 or container 114a. In this example, the vA 320 communicates with a plurality of component or host servers 330a, 334a, 336a which store components for execution by users (e.g., Web server 210A with Web components, App server 210B with application components, DB server 210C with database components, etc.). As shown in the example of FIG. 3, component servers 334a, 336a can stem from component server 330a rather than (or in addition to) directly from the virtual appliance 320, although the vA 320 can still communicate with such servers 334a, 336a. The LB 310 enables the multiple vAs 320-324 and multiple servers 330-336 to appear as one device to a user. Access to functionality can then be distributed among appliances 320-324 by the LB 310 and among servers 330a-336a by the respective appliance 320, for example.

In the example installation 300, each vA 320, 322, 324 includes a management endpoint 340, 342, 344. Each component server 330a, 334a, 336a includes a management agent 350a, 354a, 356a. The management agents 350a-356a can communicate with their respective endpoint 340 to facilitate transfer of data, execution of tasks, etc., for example. The LB 310 can use least response time, round-robin, and/or other method to balance traffic to vAs 320-324 and servers 330-336, for example.

In certain examples, a graphical user interface associated with a front end of the load balancer 310 guides a customer through one or more questions to determine system requirements for an installation 300 to be performed. Once the customer has completed the questionnaire and provided firewall access to install the agents 350a-356a, the agents 350a-356a communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (e.g. vA 320) is accessing different servers (e.g. Component Servers 330a-336a) depending upon what functionality is to be executed.

In certain examples agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

As will be discussed in greater detail subsequently herein, one or more of the virtual appliances (vAs) can be configured as a Deployment Customization Virtual Appliance 324. Similar to vA 320 communicating with the plurality of component or host servers 330a, 334a, 336a, the Deployment Customization Virtual Appliance 324 can similarly communicate with another plurality of component or host servers 330b, 334b, 336b, which can likewise store components for execution by users (e.g., Web server 210A with Web components, App server 210B with application components, DB server 210C with database components, etc.). Each component server 330b, 334b, 336b associated with the Deployment Customization Virtual Appliance 324 can include a respective management agent 350b, 354b, 356b. These management agents 350b-356b can communicate with their respective endpoint 344 of Deployment Customization Virtual Appliance 324 to facilitate transfer of data, execution of tasks, etc., for example.

Figure 4A:
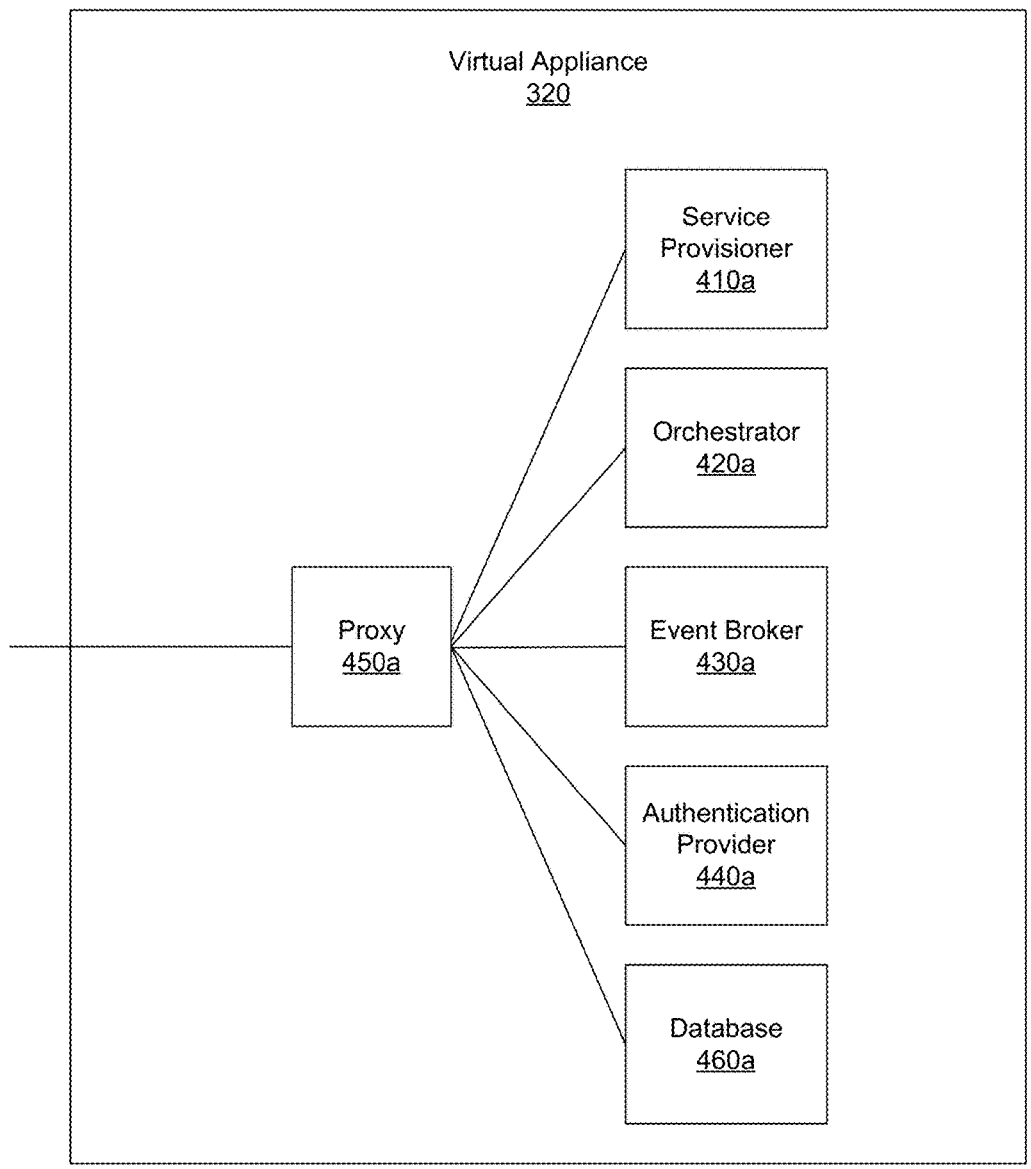
FIGS. 4A-4F illustrate example implementations of virtual appliances.

FIGS. 4A-4F illustrate example implementations of virtual appliances. The example of FIG. 4A illustrates a generalized example implementation of a vA 320 of FIG. 3.

FIGS. 4B-4F illustrate particular example implementation of the Deployment Customization Virtual Appliance 324. Looking first at the example of FIG. 4A, the vA 320 of this example includes a Service Provisioner 410a, an orchestrator 420a, an event broker 430a, an authentication provider 440a, an internal reverse proxy 450a, and a database 460a. The components 410a, 420a, 430a, 440a, 450a, 460a of the vA 320 may be implemented by one or more of the VMs 114 or containers 114a. The example Service Provisioner 410a provides services to provision interfaces (e.g., Web interface, application interface, etc.) for the vA 320. The example orchestrator (e.g., vCO) 420a is an embedded or internal orchestrator for processing workflows, which can leverage a provisioning manager, such as the application director 106 and/or catalog database 130 and/or cloud manager 138, to provision VM services but is embedded in the vA 320. For example, the vCO 420a can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS extends this to also request, approve, provision, operate, and decommission any type of catalog items (i.e storage, applications, accounts, and anything else that the catalog provides as a service).

The example event broker 430a of FIG. 4A provides a mechanism to handle tasks which are transferred between services with the orchestrator 420a. The example authentication provider 440a (e.g., VMware Horizon™ services, etc.) authenticates access to services and data, for example.

The components of the vA 320 access each other through REST API calls behind the internal reverse proxy 450a (e.g., a high availability (HA) proxy HAProxy) which provides a high availability load balancer and proxy for Transmission Control Protocol (TCP) and Hypertext Transfer Protocol (HTTP) based application requests. In this example, the proxy 450a forwards communication traffic from within the vA 320 and/or between vAs 320, 322, 324 of FIG. 3 to the appropriate component(s) of the vA 320. In certain examples, services access the local host/proxy 450a on a particular port, and the call is masked by the proxy 450a and forwarded to the particular component of the vA 320. Since the call is masked by the proxy 450a, components can be adjusted within the vA 320 without impacting outside users.

Figure 4B:
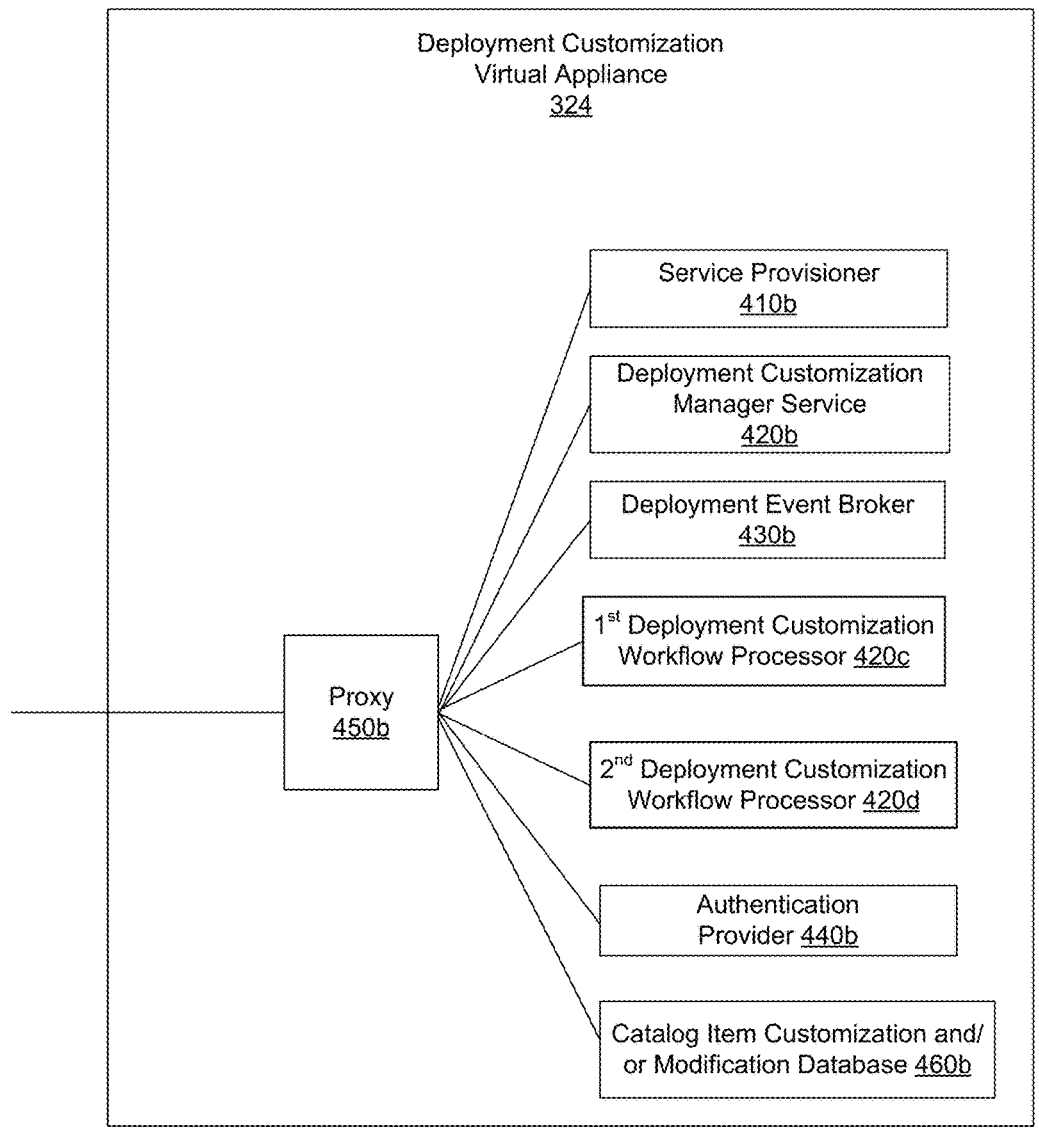
Figure 4C:
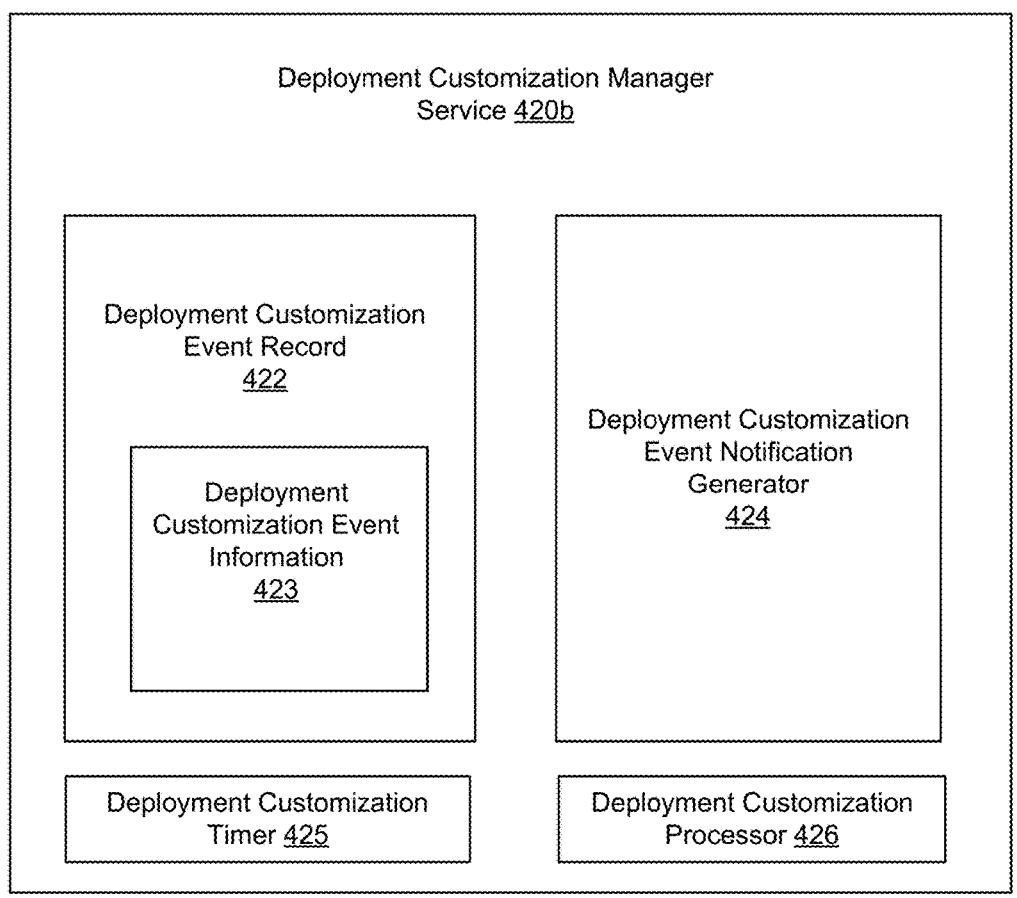
Figure 4D:
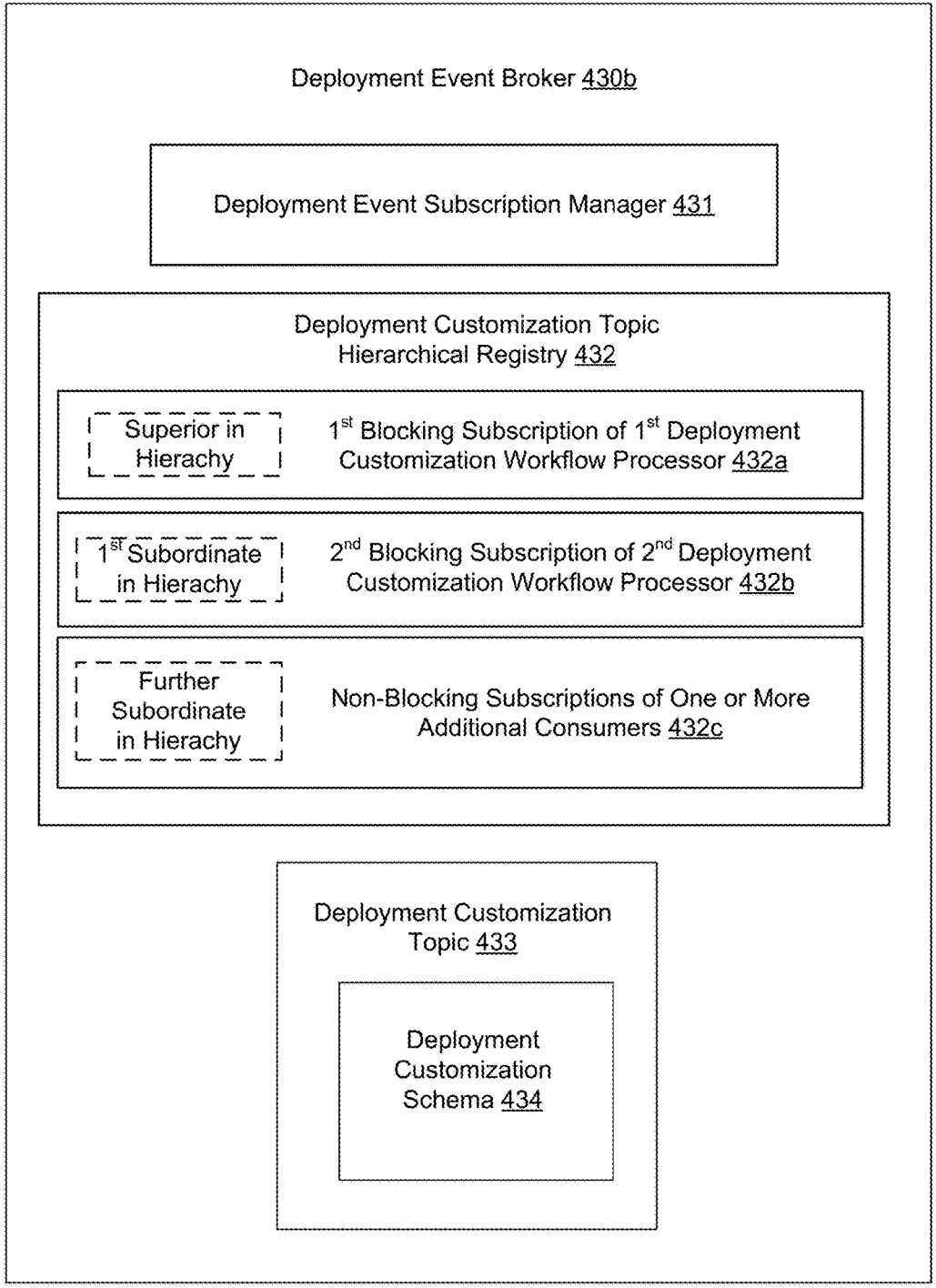
Figure 4E:
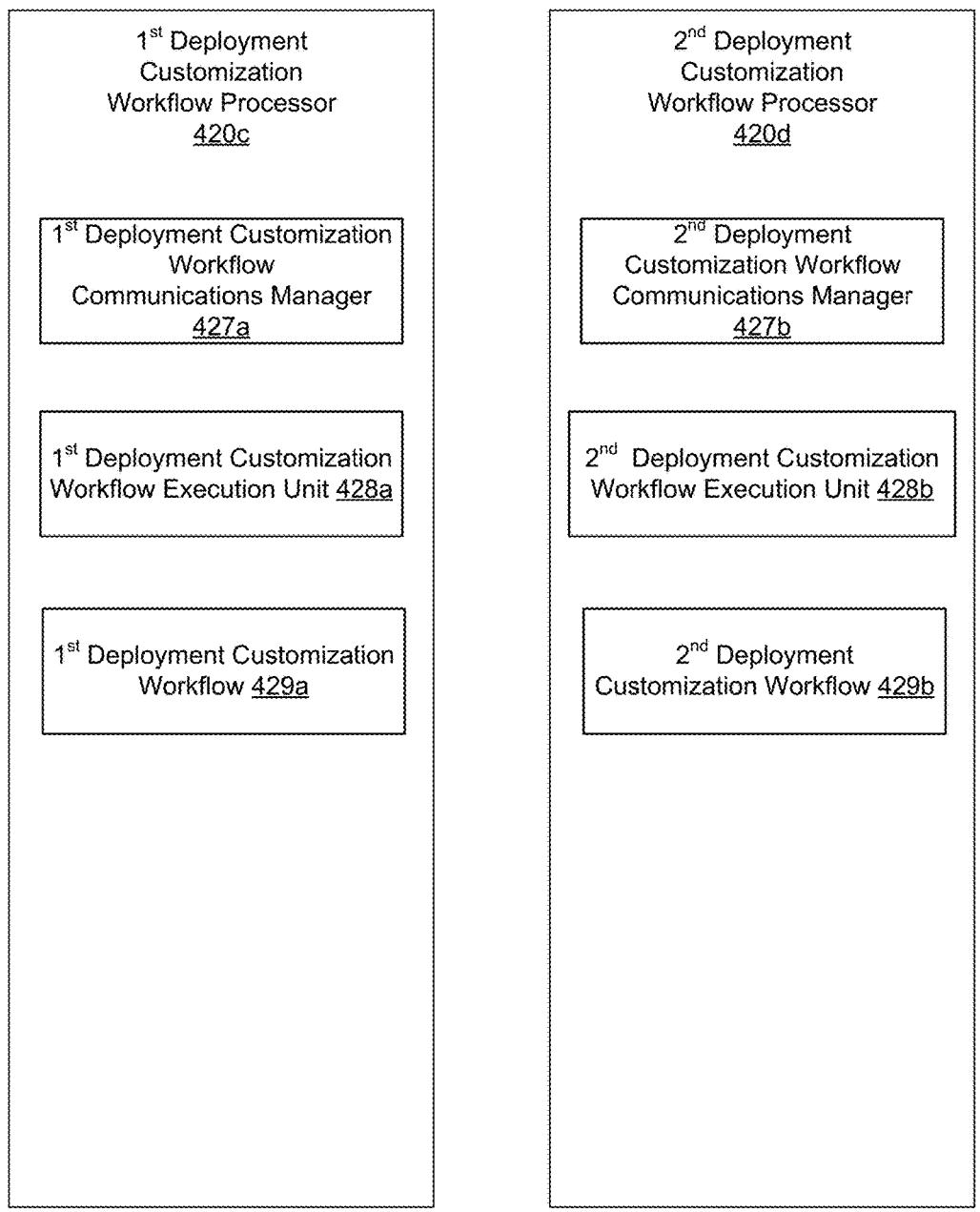
Figure 4F:
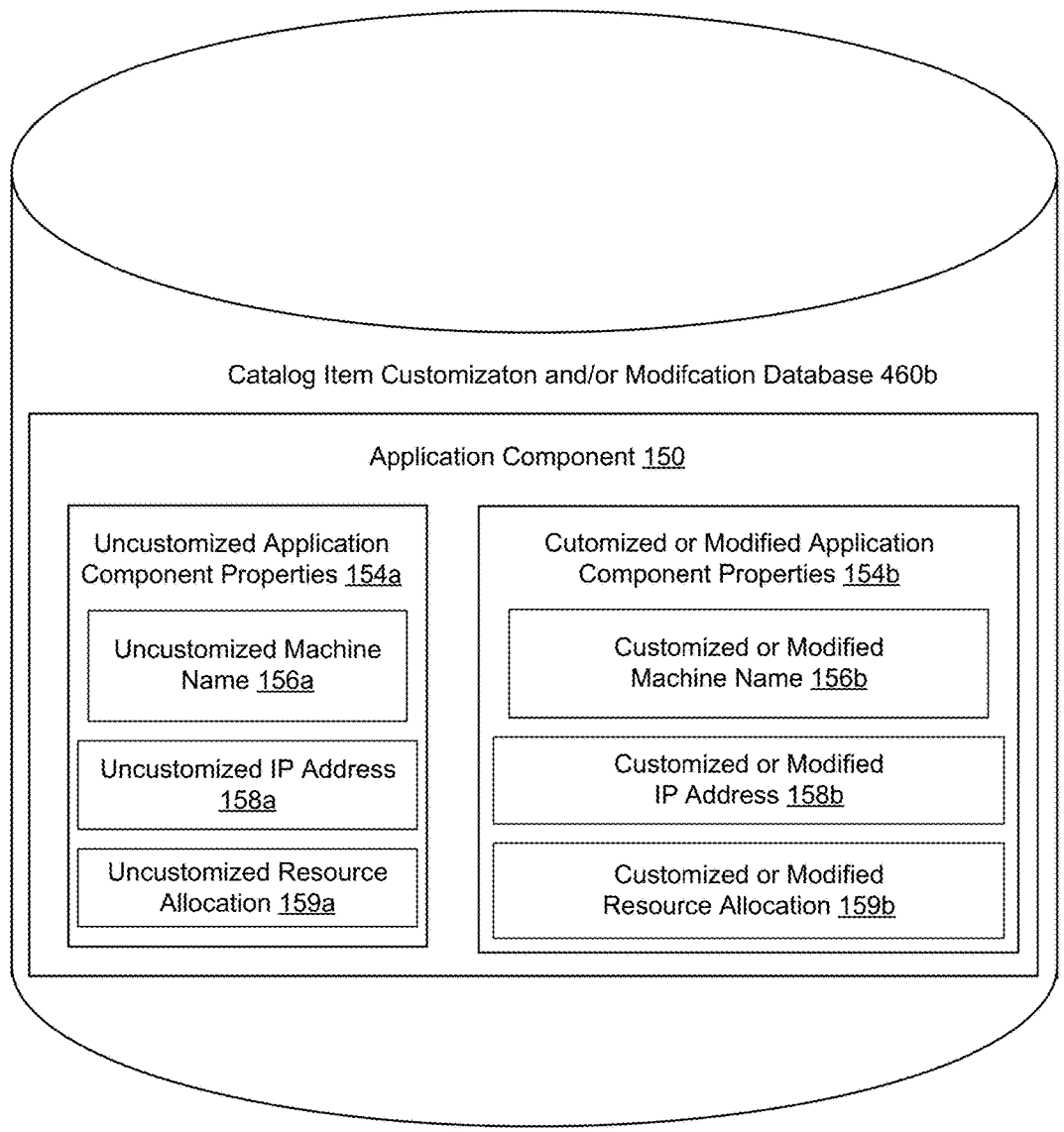

FIGS. 4B-4F illustrate an example implementation of the Deployment Customization Virtual Appliance 324 of FIG. 4A. In the example of FIGS. 4B-4F the Deployment Customization Virtual Appliance 324 includes a Service Provisioner 410b and a Deployment Customization Manager Service 420b. The Deployment Customization Manager Service 420b can include a Deployment Customization Event Record 422, Deployment Customization Event Information 423, a Deployment Customization Event Notification Generator 424, a Deployment Customization Timer 425 and a Deployment Customization Processor 426 as shown in the example of FIG. 4C. The Deployment Customization Virtual Appliance 324 further includes First and Second Deployment Customization Workflow Processors 420c, 420d. The First Deployment Customization Workflow Processor 420c can include a First Deployment Customization Workflow Communications Manager 427a, a First Deployment Customization Workflow Execution Unit 428a, and First Deployment Customization Workflow 429a as shown in FIG. 4E. Similarly, the Second Deployment Customization Workflow Processor 420d can include a Second Deployment Customization Workflow Communications Manager 427b, a Second Deployment Customization Workflow Execution Unit 428b and Second Deployment Customization Workflow 429b as shown in FIG. 4E. The Deployment Customization Virtual Appliance 324 further includes a Deployment Event Broker 430b. The Deployment Event Broker 430b can include a Deployment Event Subscription Manager 431, a Deployment Customization Topic Hierarchical Registry 432, a Registration of a First Blocking Subscription 432a, a Registration of a Second Blocking Subscription 432b, a Registration of Non-Blocking Subscriptions 432c, a Deployment Customization Topic 433 and a Deployment Customization Schema 434, as shown in FIG. 4D. The Deployment Customization Virtual Appliance 324 of the example of FIG. 4B further includes an Authentication Provider 440b, a Proxy 450b and a Catalog Item Customization or Modification Database 460b. The Catalog Item Customization or Modification Database 460b can include Application Component 150, Uncustomized Application Component Properties 154a, Customized or Modified Application Component Properties 154b, Uncustomized Machine Name 156a as shown in the FIG. 4F, Customized or Modified Machine Name 156b, Uncustomized IP Address 158a, Customized or Modified IP Address 158b, An Customized Resource Allocation 159a and Customized or Modified Resource Allocation 159b. The components 150, 154a, 154b, 156a, 156b, 158a, 158b, 159a, 159b, 410b, 420b, 422, 423, 424, 425, 426, 420c, 420d, 427a, 427b, 428a, 428b, 429a, 429b, 430b, 431, 432, 432a, 432b, 432c, 433, 434, 440b, 450b, and 460b of the Deployment Customization Virtual Appliance 324 may be implemented by one or more VM's 114 or containers 114a.

Similar to what was discussed previously in connection with FIG. 4A, in the example of FIGS. 4B-4F, the Deployment Customization Virtual Appliance 324 includes a Service Provisioner 410b and an internal reverse proxy 450b. The Service Provisioner 410b provides services to provision interfaces (e.g., Web interface, application interface, etc.) for the Deployment Customization Virtual Appliance 324. The proxy 450b forwards communication traffic from within the Deployment Customization Virtual Appliance 324 and/or between vAs 320, 322, 324 of FIG. 3 to the appropriate component(s) of the Deployment Customization Virtual Appliance 324. The components of the Deployment Customization Virtual Appliance 324 access each other through REST API calls behind the internal reverse proxy 450b (e.g., a high availability (HA) proxy HAProxy) which provides a high availability load balancer and proxy for Transmission Control Protocol (TCP) and Hypertext Transfer Protocol (HTTP) based application requests.

Further, the previous discussions of the example orchestrator (e.g., vCO) 420a are likewise applicable to the Deployment Customization Manager Service 420b, and the First and Second Deployment Customization Workflow Processors 420c, 420d. The Deployment Customization Manager Service 420b, and the First and Second Deployment Customization Workflow Processors 420c, 420d be embedded or internal, but also can be external, and can function as orchestrators for processing workflows. The Deployment Customization Manager Service 420b, and the First and Second Deployment Customization Workflow Processors 420c, 420d can leverage the provisioning manager, such as the application director 106 and/or catalog database 130 and/or cloud manager 138, to provision VM services, but can be embedded in the Deployment Customization Virtual Appliance 324. For example, the Deployment Customization Manager Service 420b, and the example First and Second Deployment Customization Workflow Processors 420c, 420d can be used to invoke a blueprint to provision a manager for services.

As another example, the Catalog Item Customization and/or Modification Database 460b shown in FIG. 4B (and shown in greater detail in FIG. 4F) can leverage the catalog database 130 shown in FIG. 1A, so that Catalog Item Customization and/or Modification Database 460b can include Uncustomized Application Component Properties 154a, which for example can include an Uncustomized Machine Name 156a, a reservation for an Uncustomized Internet Protocol (IP) Address 158a, and an Uncustomized Resource Allocation 159a. As mentioned previously, the forgoing are related to VM's. For example, the Uncustomized Resource Allocation 159a can be broadly directed to examples such as Uncustomized Central Processing Unit (CPU) Allocation for VM's, and Uncustomized Memory Allocation for VM's, etc. As will be discussed in greater detail subsequently herein, the Uncustomized Application Properties 154a can be customized and/or modified so as to provide for deployment customization. For example, once Uncustomized Application Component Properties 154a have been customized and/or modified in accordance with this disclosure, as will be discussed in greater detail subsequently herein, Customized or Modified Application Component Properties 154b can be associated with the Application Component 150 in the Catalog Item Customization or Modification Database 460b. Just as the Uncustomized Application Component Properties 154a, can include Uncustomized Machine Name 156a, Uncustomized Internet Protocol (IP) Address 158a, and Uncustomized Resource Allocation 159a, so likewise Customized or Modified Application Component Properties 154b can include Customized or Modified Machine Name 156b, Customized or Modified Internet Protocol (IP) Address 158b, and Customized or Modified Resource Allocation 159b. The Application Component 150 can provide a logical template of Application 102, 102a for deployment in an Application Deployment Environment 112. The Catalog Item Customization or Modification Database 460b can include the Application Component 150 to provide the logical template of the Application 102, 102a.

The example Deployment Customization Manager Service, also referenced more generally as Deployment Customization Manager 420b, can be implemented as a service. As mentioned previously, various services can include catalog services, identity services, component registry services, event broker services, IaaS, XaaS, etc. Using the IaaS, the Deployment Customization Manager Service 420b and/or the First and Second Deployment Customization Workflow Processors 420c, 420d can provision one or more VMs for the customer via the Deployment Customization Virtual Appliance 324. This can be extended using the XaaS, so that the Deployment Customization Manager Service 420b and/or the First and Second Deployment Customization Workflow Processors 420c, 420d can provide for various deployment activities (e.g. requesting, approving, provisioning, operating, and/or decommissioning) with respect to any type of catalog database 130 items (e.g. storage, applications, accounts, and anything else that the catalog database 130 provides as a service).

As mentioned previously, Catalog services provide the user interface via which the user can request provisioning of different preset environments (e.g., a VM including an operating system and software and some customization, etc.), for example. When a user requests a catalog item that can be customized, this is an example of an occurrence of a deployment customization event (a deployment customization event occurrence.) For example, the catalog item can be an Application Component 150. When a user requests the Application Component 150, this is an example of a deployment customization event occurrence.

The Deployment Customization Manager Service 420b shown in FIG. 4B (and shown in greater detail in FIG. 4C) can include a Deployment Customization Event Record 422 that records Deployment Customization Event Information 423 about the Deployment Customization Event Occurrence. For example, the Deployment Customization Manager Service 420b can include a Deployment Customization Event Record 422 that records Deployment Customization Event information 423 about the user requesting the Application Component 150. The Deployment Customization Event Record 422 that records Deployment Customization Event Information 423 about the deployment customization event occurrence can include a deployment Customization event log 422.

The Deployment Customization Manager Service 420b can include a Deployment Customization Processor 426 to process the Deployment Customization Event Information, and can further include a Deployment Customization Event Notification Generator 424. The Deployment Customization Event Notification Generator 424 of the Deployment Customization Manager 420b can generate a first Deployment Customization Event Notification in response to the Deployment Customization Event Record 422 that records Deployment Customization Event Information 423 about a deployment customization event occurrence. The first Deployment Customization Event Notification can include Deployment Customization Event Information 423, and can include a First Notification Payload including the Uncustomized Application Component Property. The Uncustomized Application Component Property of the First Notification Payload can include at least one of the Uncustomized Machine Name 156a, the reservation for the Uncustomized Internet Protocol (IP) Address 158a, and the Uncustomized Resource Allocation 159a. The Uncustomized Resource Allocation 159a can be broadly directed to examples such as uncustomized Central Processing Unit (CPU) allocation for VM's, and uncustomized memory allocation for VM's, etc. The first deployment event notification can also include a serialized form of at least a portion of the Deployment Customization Event Record 422 that records the Deployment Customization Event Information 423 about the deployment event occurrence.

The Deployment Customization Event Notification Generator 424 of the Deployment Customization Manager Service 420b can send the First Deployment Customization Event Notification to the Deployment Event Broker 430b. The Authentication Provider 440b can authenticate access to the Deployment Event Broker 430b. The Deployment Customization Event Broker 430b of this example includes a scalable distributed service. The Deployment Customization Manager Service 420b can start the Deployment Customization Timer 425 running, when the Deployment Customization Manager Service 420b sends the First Deployment Customization Event Notification to the Deployment Event Broker 430b. The Deployment Customization Manager Service 420b can wait, for a predetermined period of time as indicated using the Deployment Customization Timer 425, for a responsive event notification (e.g. a reply-back) from the Deployment Event Broker 430b. For example, if the predetermined time period is 24 hours, then the Deployment Customization Manager Service 420b can wait for 24 hours for a reply-back from the Deployment Event Broker 430b. If the Deployment Customization Manager Service 420b receives no reply-back from the Deployment Event Broker 430b within the predetermined time period as indicated by the Deployment Customization Timer 425, then the Deployment Customization Manager Service 420b can notify the user.

An example implementation of the Deployment Event Broker 430b of FIG. 4B is shown in FIG. 4D. In the example of FIG. 4D, the Deployment Event Broker 430b includes a Deployment Event Subscription Manager 431, a Deployment Customization Topic Registry 432, a Deployment Customization Topic 433. The Deployment Customization Topic 433 can include a Deployment Customization Schema 434. The Deployment Customization Topic Registry 432 can be hierarchical, so as provide a Deployment Customization Topic Hierarchical Registry 432 (or a Hierarchical Registry 432 of the Deployment Customization Topic 433.)

The Deployment Customization Topic Hierarchical Registry 432 can provide for a hierarchical registry of subscriptions to the Deployment Customization Topic 433. In the example of FIG. 4D a first blocking subscription 432a of the first customization workflow processor 420c is superior in the hierarchy of the Hierarchical Registry 432. A second blocking subscription 432b of the second customization workflow processor 420d is a first subordinate in the hierarchy of the Hierarchical Registry 432. Accordingly, in the hierarchy of the example Hierarchical Registry 432, the second blocking subscription 432b of the second customization workflow processor 420d is subordinate to the first blocking subscription 432a of the first customization workflow processor 420c. Although not shown in the example of FIG. 4D, other examples of the Hierarchical Registry 432 can include a second subordinate in the hierarchy of the Hierarchical Registry 432, which can be a third blocking subscription of a third customization workflow processor. Similarly, in other examples, the Hierarchical Registry 432 can include a third subordinate in the hierarchy of the Hierarchical Registry, which can be a fourth blocking subscription of a fourth customization workflow processor, and so on. In various other examples, any number of blocking and/or non-blocking consumers may be present.

In the example shown in FIG. 4D, non-blocking subscriptions 432c of one or more additional consumers can be further subordinate (e.g. below the first and second blocking subscriptions) in the hierarchy of the Hierarchical Registry 432. As a general matter, workflow processors, such as the First and Second Customization Workflow Processors 420c, 420d, as well as the one or more additional consumers each register their respective subscriptions at the Hierarchical Registry 432 of the Deployment Event Broker 430b to receive notifications published by the Deployment Customization Topic 433. However, since the First and Second Customization Workflow Processors 420c, 420d are blocking consumers, each having respective First and Second Blocking Subscriptions 431, 432, registered at the Hierarchical Registry 432 of the Deployment Event Broker 430b, notifications are published in an ordered sequence according to the hierarchy of the Hierarchical Registry 432.

For example, as will be discussed in greater detail subsequently herein, the ordered sequence according to the hierarchy of the Hierarchical Registry 432 can be as follows. First, consume, via the Deployment Event Broker 430b, the First Deployment Customization Event Notification, when the Deployment Customization Manager Service 420b sends the First Deployment Customization Event Notification to the Deployment Event Broker 430b. Next, publish according to the hierarchy, via the Deployment Customization Topic 433 of the Deployment Event Broker 430b, the First Deployment Customization Event Notification to the First Customization Workflow Processor 420c, while the First Blocking Subscription 432a blocks the Second Customization Workflow Processor 420d and the one or more additional consumers from receiving the First Deployment Customization Event Notification from the Deployment Customization Topic 433 (and while the First Blocking Subscription 432a blocks the Second Customization Workflow Processor 420d and the one or more additional consumers from receiving any notification from the Deployment Customization Topic 433, until after the First Customization Workflow Processor 420c replies back to the Deployment Customization Topic 433 with a Second Deployment Customization Event Notification.) Next, reply-back, via the First Customization Workflow Processor 420c, with the Second Deployment Customization Event Notification to the Deployment Customization Topic 433. Next, publish according to the hierarchy, via Deployment Customization Topic 433 of the Deployment Event Broker 430b, the Second Deployment Customization Event Notification to the second Customization Workflow Processor 420d, while the Second Blocking Subscription 432b blocks the one or more additional consumers from receiving the Second Deployment Customization Event Notification from the Deployment Customization Topic 433 (and while the Second Blocking Subscription 432b blocks the one or more additional consumers from receiving any notification from the Deployment Customization Topic 433, until after the Second Customization Workflow Processor 420d replies back to the Deployment Customization Topic 433 with a third Deployment Customization Event Notification.) Next, reply-back, via the Second Customization Workflow Processor 420d, with the Third Deployment Customization Event Notification to the Deployment Customization Topic 433. Next, publish according to the hierarchy, via Deployment Customization Topic 433 of the Deployment Event Broker 430b, the third Deployment Customization Event Notification to the additional consumers. Next, reply-back, via Deployment Customization Topic 433 of the Deployment Event Broker 430b, with the third Deployment Customization Event Notification to the Deployment Customization Manager Service 420b. Such an approach is shown and discussed subsequently herein in connection with FIG. 5.

In the illustrated example, according to the hierarchy of the Hierarchical Registry 432 of the Deployment Customization Topic 433, the Second Blocking Subscription 432b can be subordinate to the First Blocking Subscription 432a, so that blocking associated with the Second Deployment Customization Workflow Processor 420d is subordinate to blocking associated with the First Deployment Customization Workflow Processor 420c. For example, because blocking associated with the Second Deployment Customization Workflow Processor 420d is subordinate to blocking associated with the First Deployment Customization Workflow Processor 420c, the First Blocking Subscription 432a of the First Deployment Customization Workflow Processor 420c first blocks the Second Customization Workflow Processor 420d and the one or more additional consumers from receiving the First Deployment Customization Event Notification from the Deployment Customization Topic 433 (and the First Blocking Subscription 432a of First Deployment Customization Workflow Processor 420c first blocks the Second Customization Workflow Processor 420d and the one or more additional consumers from receiving any notification from the Deployment Customization Topic 433, until after the First Customization Workflow Processor 420c replies back to the Deployment Customization Topic 433 with a Second Deployment Customization Event Notification.) Moreover, because blocking associated with the Second Deployment Customization Workflow Processor 420d is subordinate to blocking associated with the First Deployment Customization Workflow Processor 420c, after the First Customization Workflow Processor 420c replies back to the Deployment Customization Topic 433 with the Second Deployment Customization Event Notification, the Second Blocking Subscription 432b of the Second Deployment Customization Workflow Processor 420d blocks the one or more additional consumers from receiving the Second Deployment Customization Event Notification from the Deployment Customization Topic 433 (and the Second Blocking Subscription 432b of the Second Deployment Customization Workflow Processor 420d blocks the one or more additional consumers from receiving any notification from the Deployment Customization Topic 433, until after the Second Customization Workflow Processor 420d replies back to the Deployment Customization Topic 433 with a third Deployment Customization Event Notification.) In the illustrated example, it should also be noted that the example Deployment Customization Topic 433 of the Deployment Event Broker 430b can be a repliable topic. For example, since the example Deployment Customization Topic 433 is repliable, the example Deployment Customization Topic 433 can accept the Second Deployment Customization Event Notification as a reply back notification from the First Deployment Customization Workflow Processor 420c subscriber, in reply back to the prior First Deployment Customization Event Notification received by the First Deployment Customization Workflow Processor 420c subscriber from the repliable Deployment Customization Topic 433. A repliable topic can be defined as capable of accepting a reply back notification from a subscriber, in reply back to a prior notification received by the subscriber from the repliable topic. For example: in FIG. 5 as discussed subsequently herein, message 503 reply-back, via the First Customization Workflow Processor 420c, with the Second Deployment Customization Event Notification to the Deployment Customization Topic 433; message 505 reply-back, via the Second Customization Workflow Processor 420d, with the Third Deployment Customization Event Notification to the Deployment Customization Topic 433; and message 507 reply-back, via Deployment Customization Topic 433 of the Deployment Event Broker 430b, with the third Deployment Customization Event Notification to the Deployment Customization Manager Service 420b are examples of replies.

In this example the First Blocking Subscription 432a of the First Deployment Customization Workflow Processor 420c can be registered at the Hierarchical Registry 432 of the Deployment Customization Topic 433 to provide for the First Deployment Customization Workflow Processor 420c receiving the First Deployment Customization Event Notification from the Deployment Customization Topic 433. The Second Blocking Subscription 432b of the Second Deployment Customization Workflow Processor 420d can likewise be registered at the Hierarchical Registry 432 of the Deployment Customization Topic 433. The First Subscription 432a of the First Customization Workflow Processor can be a First Blocking Subscription 432a and is registered at the Deployment Customization Topic 433 to block the Second Deployment Customization Workflow Processor 420d from receiving the First Deployment Customization Event Notification. Additional non-blocking subscriptions 432c, corresponding to respective additional non-blocking consumers are registered at the deployment customization topic 433. The First Subscription 432a of the First Customization Workflow Processor 420c is a First Blocking Subscription 432a and is registered at the Hierarchical Registry 432 of the Deployment Customization Topic 433 to block the additional consumers from receiving the First Deployment Customization Event Notification from the Deployment Customization Topic 433.

Moreover, in this example the First Subscription 432a of the First Customization Workflow Processor 420c can be a First Blocking Subscription 432a and can be registered at the Hierarchical Registry 432 of the Deployment Customization Topic 433 to block the additional consumers from receiving any Deployment Customization Event Notification until after the First Deployment Customization Workflow Processor 420c replies back to the Deployment Customization Topic 433 with the Second Deployment Event Notification. The First Subscription 432a of the First Deployment Customization Workflow Processor 420c can be a First Blocking Subscription 432a and can be registered at the Hierarchical Registry 432 of the Deployment Customization Topic 433 to block the Second Deployment Customization Workflow Processor 420d from receiving any Deployment Customization Event Notification until after the First Deployment Customization Workflow Processor 420c replies-back to the Deployment Customization Topic 433 with the second deployment event notification.

The Second Subscription 432b of the Second Deployment Customization Workflow Processor 420d can be registered at the Deployment Customization Topic 433 so as to provide for the Second Deployment Customization Workflow Processor 420d receiving the Second Deployment Customization Event Notification from the deployment customization topic 433. The Second Subscription 432b of the Second Customization Workflow Processor can be a Second Blocking Subscription 432b and can be registered at the Hierarchical Registry 432 of the Deployment Customization Topic 433 to block the additional consumers from receiving any deployment customization event notification until after the Second Deployment Customization Workflow Processor 420d replies-back to the Deployment Customization Topic 433 with the Third Deployment Customization Notification. For example, Third and fourth subscriptions each corresponding to a respective third and fourth non-blocking consumer can be registered at the Hierarchical Registry 432 of the Deployment Customization Topic 433. The Second Subscription 432b of the Second Deployment Customization Workflow Processor 420d can be a Second Blocking Subscription 432b and can be registered at the Hierarchical Registry 432 of the Deployment Customization Topic 433 to block the third and fourth non-blocking consumers from receiving any deployment customization event notification until after the Second Deployment Customization Workflow Processor 420d replies-back to The Deployment Customization Topic 433 with the Third Deployment Event Notification.

Example implementations of the First and Second Deployment Customization Workflow Processors 420c, 420d shown in FIG. 4B are shown in greater detail in FIG.

4E. As shown in FIG. 4E, the First Deployment Customization Workflow Processor 420c can include a First Deployment Customization Workflow Communications Manager 427a to manage communications with the First Deployment Customization Workflow Processors 420c. Additionally, the First Deployment Customization Workflow Processor 420c can include a First Deployment Customization Workflow Execution Unit 428a to process the First Deployment Customization Workflow 429a.

Similarly, as shown in FIG. 4E, the Second Deployment Customization Workflow Processor 420d can include a Second Deployment Customization Workflow Communications Manager 427b to manage communications with the Second Deployment Customization Workflow Processors 420d. Additionally, the Second Deployment Customization Workflow Processor 420d can include a Second Deployment Customization Workflow Execution Unit 428b to process the Second Deployment Customization Workflow 429b.

For example, as mentioned previously, the Deployment Customization Topic 433 of the Deployment Event Broker 430b can publish the First Deployment Customization Event Notification to the First Customization Workflow Processor 420c. In response, the First Customization Workflow Processor 420c can: consume the First Deployment Customization Event Notification (including the First Notification Payload); customize the First Notification Payload into the Second Notification Payload; and reply-back to the Deployment Customization Topic 433 of the Deployment Event Broker 430b with the Second Deployment Customization Event Notification (including the Second Notification Payload.).

More particularly, the First Deployment Customization Event Notification can include the First Notification Payload, which can include the Uncustomized Application Component Property. The First Deployment Customization Workflow Processor 420c can process the First Deployment Customization Workflow 429a to customize the Uncustomized Application Component Property of the First Notification Payload into the Customized Application Component Property of the Second Notification Payload. As mentioned previously, the Uncustomized Application Component Properties 154a, for example can include an Uncustomized Machine Name 156a, a reservation for an Uncustomized Internet Protocol (IP) Address 158a, and an Uncustomized Resource Allocation 159a. As mentioned previously, the forgoing are related to VM's and/or containers. For example, the Uncustomized Resource Allocation 159a can be broadly directed to examples such as Uncustomized Central Processing Unit (CPU) Allocation for VM's and/or, and Uncustomized Memory Allocation for VM's and/or containers, etc.

For example, at least one of the Uncustomized Application Component Properties 154a of the First Notification Payload can be customized by the First Deployment Customization Workflow Processor 420c into at least one of the Customized Application Component Properties 154b of the Second Notification Payload. More particularly, for example, the Uncustomized Virtual Machine Name 156a (for example "foo-machine-name") of the First Notification Payload can be customized into the Customized Virtual Machine Name 156b (for example "my-foo-machine-name") of the Second Notification Payload. For example, the Uncustomized Virtual Machine Internet Protocol (IP) Address Reservation 158a (for example "198.111.111") can be customized into the Customized Virtual Machine Internet Protocol (IP) Address Reservation 158b (for example "198.999.999").

Similarly, for example, at least one Uncustomized Virtual Machine Resource Allocation 159a of the First Notification Payload can be customized by the First Deployment Customization Workflow Processor 420c into at least one Customized Virtual Machine Resource Allocation 159b of the Second Notification Payload. For example, the Uncustomized Virtual Machine Memory Allocation (for example "4 Gigabytes of Memory") of the First Notification Payload can be customized into the Customized Virtual Machine Memory Allocation (for example "2 Gigabytes of Memory") of the Second Notification Payload. For example, the Uncustomized Central Processing Unit (CPU) Allocation (for example "4 CPUs") of the First Notification Payload can be customized into the Customized Central Processing Unit (CPU) Allocation (for example "2 CPU's") of the Second Notification Payload.

For avoidance of doubt, it should be understood the forgoing are just some examples, and various other examples can likewise be implemented in accordance with this disclosure. For example, it should be understood that the Second Notification Payload can include a mix that can include an Uncustomized Application Component Property in addition to the Customized Application Component Property. For example, the Second Notification Payload can include the Uncustomized Virtual Machine Name 156 (for example "foo-machine-name") and Uncustomized Virtual Machine Internet Protocol (IP) Address Reservation 158a (for example "198.111.111") in a mix along with the Customized Virtual Machine Memory Allocation (for example "2 Gigabytes of Memory") and along with the Customized Central Processing Unit (CPU) Allocation (for example "2 CPU's")

For example, the First Deployment Customization Workflow Processor 420c can generate the Second Deployment Customization Event Notification that includes the Second Notification Payload, which includes the Customized Application Component Property. For example, the First Deployment Customization Workflow Processor 420c can reply-back to the Deployment Customization Topic 433 with the Second Deployment Customization Event Notification that includes the Second Notification Payload, which includes the Customized Application Component Property.

For example, at a point in time after First Deployment Customization Workflow Processor 420c replies-back to the Deployment Customization Topic 433 with the Second Deployment Customization Event Notification, the Deployment Customization Topic 433 can publish to the Second Deployment Customization Workflow Processor 420d the Second Deployment Customization Event Notification. For example, the Second Deployment Customization Event Notification can include the Second Notification Payload, which can include the Customized Application Component Property.

In response, the Second Customization Workflow Processor 420d can: consume the Second Deployment Customization Event Notification (including the Second Notification Payload); modify the Second Notification Payload into the Third Notification Payload; and reply-back to the Deployment Customization Topic 433 of the Deployment Event Broker 430b with the Third Deployment Customization Event Notification (including the Third Notification Payload.). For example, the Third Notification Payload can include the Customized Application Component Property in addition to the Modified Application Component Property. Moreover, for example, the Third Notification Payload can include the Uncustomized Application Component Properties 154a in addition to the Customized Application Component Property and in addition to the Modified Application Component Property.

In various examples, in accordance with this disclosure, at least one of the Uncustomized Application Component Properties 154a and/or at least one of the Customized Application Component Properties 154b of the Second Notification Payload can be modified by the Second Deployment Customization Workflow Processor 420d into at least one of the Modified Application Component Properties 154b of the Third Notification Payload. More particularly, for example, the Uncustomized Virtual Machine Name 156a (for example "foo-machine-name") or the Customized Virtual Machine Name 156b (for example "my-foo-machine-name") of the Second Notification Payload can be modified into the Modified Virtual Machine Name 156b (for example "my-own-foo-machine-name") of the Third Notification Payload. For example, the Uncustomized Virtual Machine Internet Protocol (IP) Address Reservation 158a (for example "198.111.111") or the Customized Virtual Machine Internet Protocol (IP) Address Reservation 158b (for example "198.999.999") of the Second Notification Payload can be modified into the Modified Virtual Machine Internet Protocol (IP) Address Reservation 158b (for example "198.999.001").

Similarly, for example, at least one Uncustomized Virtual Machine Resource Allocation 159a and/or at least one Customized Virtual Machine Resource Allocation 159b of the First Notification Payload of the Second Notification Payload can be modified by the Second Deployment Customization Workflow Processor 420d into at least one Modified Virtual Machine Resource Allocation 159b of the Third Notification Payload. For example, the Uncustomized Virtual Machine Memory Allocation (for example "4 Gigabytes of Memory") or the Customized Virtual Machine Memory Allocation (for example "2 Gigabytes of Memory") of the Second Notification Payload can be modified into the Modified Virtual Machine Memory Allocation (for example "1 Gigabyte of Memory") of the Third Notification Payload. For example, the Uncustomized Central Processing Unit (CPU) Allocation (for example "4 CPUs") or the Customized Central Processing Unit (CPU) Allocation (for example "2 CPU's") of the Second Notification Payload can be modified into the Modified Central Processing Unit (CPU) Allocation (for example "1 CPU") of the Third Notification Payload.

For avoidance of doubt, it should be understood the forgoing are just some examples, and various other examples can likewise be implemented in accordance with this disclosure. For example, it should be understood that the Third Notification Payload can include a mix that includes the Uncustomized Application Component Property in addition to the one or Customized Application Component Properties 154 b in addition to the Modified Application Component Property. For example, the Third Notification Payload can include the Uncustomized Virtual Machine Name 156 (for example "foo-machine-name") and Modified Virtual Machine Internet Protocol (IP) Address Reservation 158a (for example "198.999.001") along with the Customized Virtual Machine Memory Allocation (for example "2 Gigabytes of Memory") and along with the Modified Central Processing Unit (CPU) Allocation (for example "1 CPU's").

For example, as illustrated by the foregoing, the Uncustomized Virtual Machine Name 156 (for example "foo-machine-name") of the First Notification Payload can remain uncustomized as the Uncustomized Virtual Machine Name 156 (for example "foo-machine-name") in the Second Notification Payload, and further can remain unmodified as the Uncustomized Virtual Machine Name 156 (for example "foo-machine-name") in the Third Notification Payload. Accordingly, for example, at least one of the Uncustomized Application Component Properties 154a of the First Notification Payload can remain uncustomized as an Uncustomized Application Component Property 154a in the Second Notification Payload, and further can remain unmodified as the Uncustomized Application Component Property 154a in the Third Notification Payload.

For example, as illustrated by the foregoing, the Uncustomized Virtual Machine Internet Protocol (IP) Address Reservation 158a (for example "198.111.111") of the First Notification Payload, can remain as the Uncustomized Virtual Machine Internet Protocol (IP) Address Reservation 158a (for example "198.111.111") in the Second Notification Payload, but then can be modified to the Modified Virtual Machine Internet Protocol (IP) Address Reservation 158a (for example "198.999.001") in the Third Notification Payload. Accordingly, for example, at least one of the Uncustomized Application Component Properties 154a of the First Notification Payload can remain uncustomized as an Uncustomized Application Component Property 154a in the Second Notification Payload, but can be modified into the Modified Application Component Property 154b in the Third Notification Payload.

For example, as illustrated by the foregoing, the Uncustomized Virtual Machine Memory Allocation (for example "4 Gigabytes of Memory") of the First Notification Payload can be customized to the Customized Virtual Machine Memory Allocation (for example "2 Gigabytes of Memory") in the Second Notification Payload, and can remain unmodified so as to be the Customized Virtual Machine Memory Allocation (for example "2 Gigabytes of Memory") in the Third Notification Payload. Accordingly, for example, at least one of the Uncustomized Application Component Properties 154a of the First Notification Payload can be customized into the Customized Application Component Property 154b in the Second Notification Payload, and can remain unmodified so as to be the Customized Application Component Property 154b in the Third Notification Payload.

For example, as illustrated by the foregoing, the Uncustomized Central Processing Unit (CPU) Allocation (for example "4 CPUs") of the First Notification Payload can be customized into the Customized Central Processing Unit (CPU) Allocation (for example "2 CPU's") of the Second Notification Payload, and then can be modified into the Modified Central Processing Unit (CPU) Allocation (for example "1 CPU") of the Third Notification Payload. Accordingly, for example, at least one of the Uncustomized Application Component Properties 154a of the First Notification Payload can be customized into the Customized Application Component Property 154b in the Second Notification Payload, and further can be modified into the Modified Application Component Property 154b in the Third Notification Payload.

For example, the Second Deployment Customization Workflow Processor 420d can generate the Third Deployment Customization Event Notification that includes the Notification Payload, which includes the Modified Application Component Property. For example, the Second Deployment Customization Workflow Processor 420d can reply-back to the Deployment Customization Topic 433 with the Third Deployment Customization Event Notification that includes the Third Notification Payload, which includes the Modified Application Component Property.

For example, the Second Deployment Customization Workflow Processor 420d can modify an application component property (e.g. an Uncustomized Application Component Property and/or a Customized Application Component Property) of the Second Notification Payload into a Modified Application Component Property of the Third Notification Payload. For example, one or more Modified Application Component Properties of the Third Notification Payload can include at least one of: a Modified Virtual Machine Name 156b, a Modified Virtual Machine Internet Protocol (IP) Address Reservation 158b, and a Modified Virtual Machine Resource Allocation 150 9b, a Modified Virtual Machine Memory Allocation and a Modified Central Processing Unit (CPU) Allocation.

For example, the Second Deployment Customization Workflow Processor 420d can generate the Third Deployment Customization Event Notification 505 that can include the Third Notification Payload, which can include the Modified Application Component Property. For example, the Second Deployment Customization Workflow Processor 420d can reply-back to the Deployment Customization Topic 433 with the Third Deployment Customization Event Notification 505 that can include the Third Notification Payload, which can include the Modified Application Component Property. For example, after the Second Deployment Customization Workflow Processor 420d replies-back to the deployment customization topic 433, the deployment customization topic 433 can publish to a third consumer the third deployment customization event notification 506 that includes the third notification payload, which includes the modified application component property.

For example, after the Second Deployment Customization Workflow Processor 420d replies back to the Deployment Customization Topic 433, the Deployment Customization Topic 433 can publish to third and/or fourth and/or fifth consumers 530, 540, 550 the Third Deployment Customization Event Notification 506 that can include the Third Notification Payload, which can include the Modified Application Component Property. For example, after the Second Deployment Customization Workflow Processor 420d replies-back to the Deployment Customization Topic 433, the Deployment Customization Topic 433 can reply-back to the Deployment Customization Manager 420b with the Third Deployment Customization Event Notification 505 that can include the Third Notification Payload, which can include the Modified Application Component Property.

For example, the deployment customization manager 420b can associate the Application Component 150 with the Modified Application Component Property in the database 460b. For example, the deployment customization manager 420b can create an association between the Application Component 150 and the Modified Application Component Property 154b in the database 460b, in place of an association between the Application Component 150 and the Uncustomized Application Component Property in the database 460b.

Figure 5:
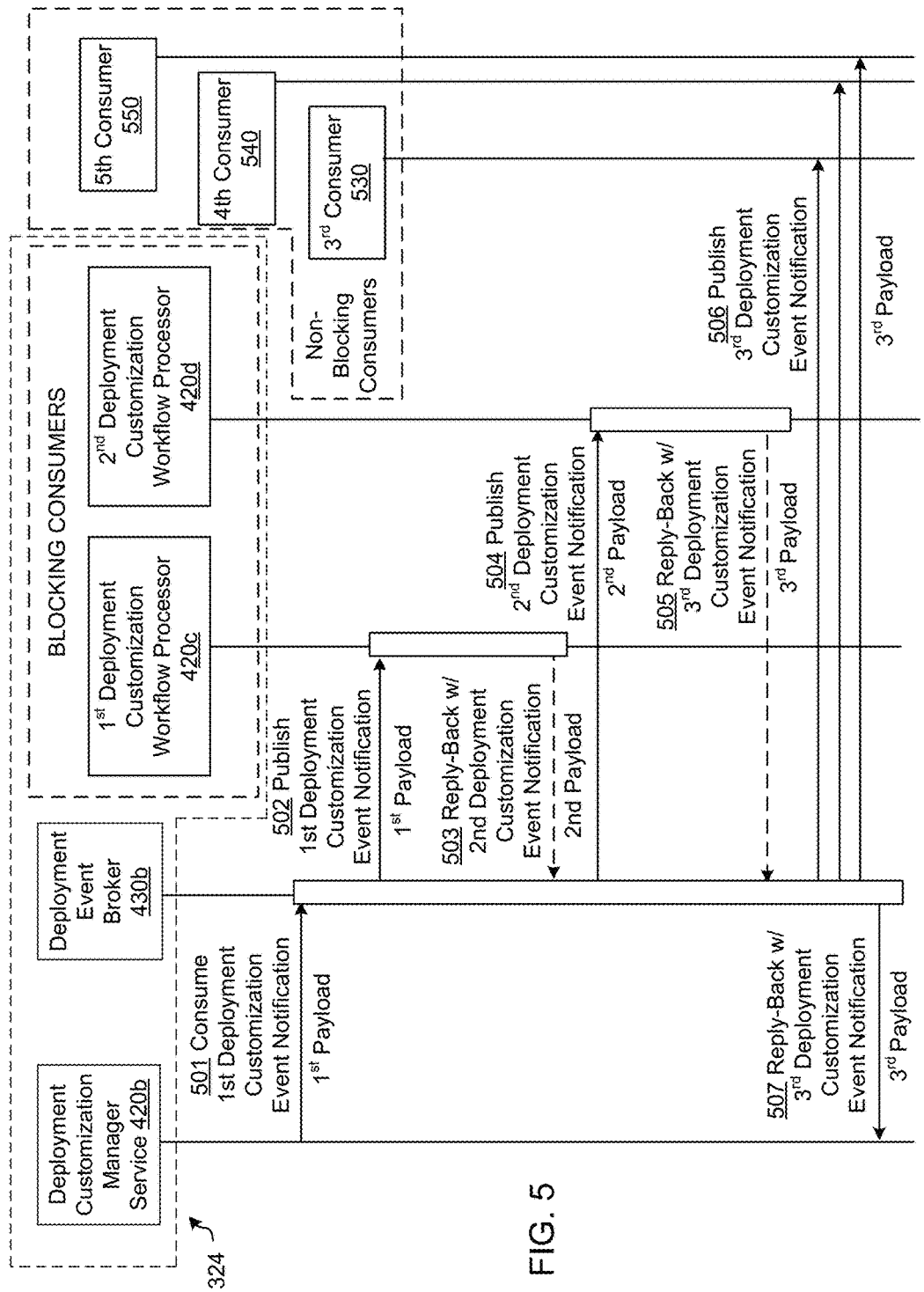
FIG. 5 illustrates an example of deployment customization event notifications occurring in the context of the example Deployment Customization Virtual Appliance 324 of FIGS. 4B-4F.

FIG. 5 illustrates an example of deployment customization event notifications occurring in the context of the example Deployment Customization Virtual Appliance 324 of FIGS. 4B-4F.

The example of FIG. 5 includes the Deployment Customization Manager Service 420b and Deployment Event Broker 430. First Deployment Customization Workflow Processor 420c and Second Deployment Customization Workflow Processor 420d can be blocking consumers, in accordance with this disclosure, and as shown in FIG. 5. Additional consumers, for example, Third Consumer 530, Fourth Consumer 540 and Fifth Consumer 550 can be non-blocking consumers, in accordance with this disclosure, and as shown in FIG. 5.

As a general matter, workflow processors, such as the First and Second Customization Workflow Processors 420c, 420d, shown in FIG. 5 as well as the additional consumers, such as Third Consumer 530, Fourth Consumer 540 and Fifth Consumer 550 can register their respective subscriptions at the Hierarchical Registry 432 of the Deployment Event Broker 430b to receive notifications published by the Deployment Customization Topic 433. However, since the First and Second Customization Workflow Processors 420c, 420d are blocking consumers, each having respective First and Second Blocking Subscriptions 431, 432, registered at the Hierarchical Registry 432 of the Deployment Event Broker 430b, notifications are published in an ordered sequence according to the hierarchy of the Hierarchical Registry 432. So as a general matter, in the example topic-based system shown in the figures, event notifications are published by event notification producers/generators to the Deployment Customization Topic 433 of the Deployment Event Broker 430b, and in turn the Deployment Customization Topic 433 publishes the event notifications to subscribers registered with the Deployment Customization Topic 433 to receive the event notifications. The Deployment Customization Topic 433 functions as a named logical channel for subscribers registered with the Deployment Customization Topic 433 to receive the event notifications. The Deployment Customization Topic 433 of the Deployment Event Broker 430b can perform a store and forward function to route event notifications from event notification producers/generators to subscribers. However, since the First and Second Customization Workflow Processors 420c, 420d are blocking consumers, each having respective First and Second Blocking Subscriptions 431, 432, registered at the Hierarchical Registry 432 of the Deployment Event Broker 430b, the Deployment Customization Topic 433 of the Deployment Event Broker 430b routes event notifications from event notification producers/generators to subscribers in the ordered sequence according to the hierarchy of the Hierarchical Registry 432 as shown in the example of FIG. 5.

In the example of FIG. 5, the ordered sequence is according to the hierarchy of the Hierarchical Registry 432. In the example of FIG. 5, first, 501 consume, via the Deployment Event Broker 430b, the First Deployment Customization Event Notification (including the First Notification Payload), when the Deployment Customization Manager Service 420b sends the First Deployment Customization Event Notification (including the First Notification Payload) to the Deployment Event Broker 430b.

Next, 502 publish according the hierarchy, via the Deployment Customization Topic 433 of the Deployment Event Broker 430b, the First Deployment Customization Event Notification (including the First Notification Payload) to the First Customization Workflow Processor 420c, while the First Blocking Subscription 432a blocks the Second Customization Workflow Processor 420d and the additional consumers from receiving the First Deployment Customization Event Notification from the Deployment Customization Topic 433 (and while the First Blocking Subscription 432a blocks the Second Customization Workflow Processor 420d and the additional consumers from receiving any notification from the Deployment Customization Topic 433, until after the First Customization Workflow Processor 420c replies back to the Deployment Customization Topic 433 with a Second Deployment Customization Event Notification.)

Next, 503 reply-back, via the First Customization Workflow Processor 420c, with the Second Deployment Customization Event Notification (including the Second Notification Payload) to the Deployment Customization Topic 433.

Next, 504 publish according to the hierarchy, via Deployment Customization Topic 433 of the Deployment Event Broker 430b, the Second Deployment Customization Event Notification (including the Second Notification Payload) to the second Customization Workflow Processor 420d, while the Second Blocking Subscription 432b blocks the additional consumers from receiving the Second Deployment Customization Event Notification from the Deployment Customization Topic 433 (and while the Second Blocking Subscription 432b blocks the additional consumers from receiving any notification from the Deployment Customization Topic 433, until after the Second Customization Workflow Processor 420d replies back to the Deployment Customization Topic 433 with a third Deployment Customization Event Notification.)

Next, 505 reply-back, via the Second Customization Workflow Processor 420d, with the Third Deployment Customization Event Notification (including the Third Notification Payload) to the Deployment Customization Topic 433.

Next, 506 publish according to the hierarchy, via Deployment Customization Topic 433 of the Deployment Event Broker 430b, the third Deployment Customization Event Notification (including the Third Notification Payload) to the additional consumers.

Next, 507 reply-back, via Deployment Customization Topic 433 of the Deployment Event Broker 430b, with the third Deployment Customization Event Notification (including the Third Notification Payload) to the Deployment Customization Manager Service 420b.

Figure 6:
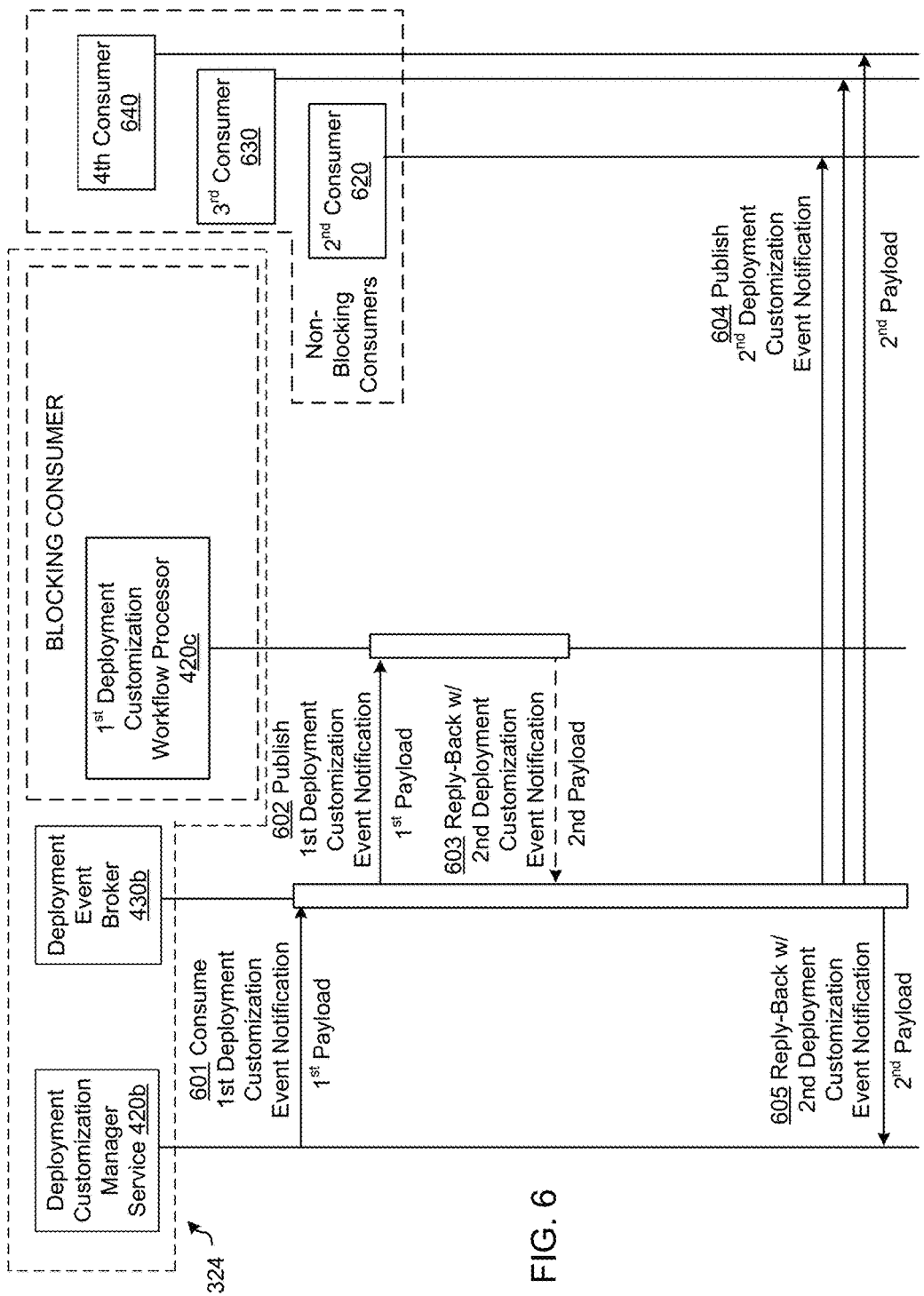
FIG. 6 illustrates an additional example of deployment customization event notifications occurring in the context of an additional example of the Deployment Customization Virtual Appliance 324 of FIGS. 4B-4F.

FIG. 6 illustrates an additional example of deployment customization event notifications occurring in the context of an additional example of the Deployment Customization Virtual Appliance 324 of FIGS. 4B-4F.

FIG. 6 shows an arrangement of Deployment Customization Manager Service 420b, and Deployment Event Broker 430. However, the example of FIG. 6 only includes one blocking consumer (e.g. First Deployment Customization Workflow Processor 420c) and so the example of FIG. 6 is greatly simplified relative to the example of FIG. 5 as discussed previously herein. In the example of FIG. 6, additional consumers, for example, Second Consumer 620, Third Consumer 630 and Fourth Consumer 640 are non-blocking consumers.

As a general matter, the First Workflow Processors 420c, in the example of FIG. 6 as well as the additional consumers, such as Second Consumer 620, Third Consumer 620 and Fourth Consumer 640 can each register their respective subscriptions at the Hierarchical Registry 432 of the Deployment Event Broker 430b to receive notifications published by the Deployment Customization Topic 433. However, since the First Customization Workflow Processor 420c is a blocking consumer, having its First Blocking Subscriptions 431 registered at the Hierarchical Registry 432 of the Deployment Event Broker 430b, notifications are published in another example ordered sequence according to the hierarchy of the Hierarchical Registry 432. So as a general matter, in the example topic-based system shown in the figures, event notifications are published by event notification producers/generators to the Deployment Customization Topic 433 of the Deployment Event Broker 430b, and in turn the Deployment Customization Topic 433 publishes the event notifications to subscribers registered with the Deployment Customization Topic 433 to receive the event notifications. The Deployment Customization Topic 433 functions as a named logical channel for subscribers registered with the Deployment Customization Topic 433 to receive the event notifications. The Deployment Customization Topic 433 of the Deployment Event Broker 430b can perform a store and forward function to route event notifications from event notification producers/generators to subscribers. However, since the First Customization Workflow Processor 420c is a blocking consumer, having its First Blocking Subscriptions 431 registered at the Hierarchical Registry 432 of the Deployment Event Broker 430b, the Deployment Customization Topic 433 of the Deployment Event Broker 430b routes event notifications from event notification producers/generators to subscribers in another example ordered sequence according to the hierarchy of the Hierarchical Registry 432 as shown in the example of FIG. 6.

In the example of FIG. 6, the example ordered sequence according to the hierarchy of the Hierarchical Registry 432 is as follows. In the example FIG. 6, first, 601 consume, via the Deployment Event Broker 430b, the First Deployment Customization Event Notification (including the First Notification Payload), when the Deployment Customization Manager Service 420b sends the First Deployment Customization Event Notification (including the First Notification Payload) to the Deployment Event Broker 430b.

Next, 602 publish according to the hierarchy, via the Deployment Customization Topic 433 of the Deployment Event Broker 430b, the First Deployment Customization Event Notification (including the First Notification Payload) to the First Customization Workflow Processor 420c, while the First Blocking Subscription 432a blocks the additional consumers from receiving the First Deployment Customization Event Notification from the Deployment Customization Topic 433 (and while the First Blocking Subscription 432a blocks the additional consumers from receiving any notification from the Deployment Customization Topic 433, until after the First Customization Workflow Processor 420c replies back to the Deployment Customization Topic 433 with a Second Deployment Customization Event Notification.)

Next, 603 reply-back, via the First Customization Workflow Processor 420c, with the Second Deployment Customization Event Notification (including the Second Notification Payload) to the Deployment Customization Topic 433.

Next, 604 publish according to the hierarchy, via Deployment Customization Topic 433 of the Deployment Event Broker 430b, the Second Deployment Customization Event Notification (including the Second Notification Payload) to the additional consumers.

Next, 605 reply-back, via Deployment Customization Topic 433 of the Deployment Event Broker 430b, with the Second Deployment Customization Event Notification (including the Second Notification Payload) to the Deployment Customization Manager Service 420b.

After the First Deployment Customization Workflow Processor 420c replies back to the Deployment Customization Topic 433 with the Second Deployment Event Notification, the Deployment Customization Topic 433 can publish to consumers 620, 630, 640 the Second Deployment Customization Event Notification 604 that includes the second notification payload, which includes the Customized Application Component Properties 154b. Further, for example, after the First Deployment Customization Workflow Processor 420c replies back to the Deployment Customization Topic 433 with the Second Deployment Event Notification, the Deployment Customization Topic 433 can reply back to the Deployment Customization Manager 420b with the Second Deployment Customization Event Notification that includes the Second Notification Payload, which includes the Customized Application Component Property. For example, the Deployment Customization Manager 420b can associate the Application Component 150 with the Customized Application Component Property in the Database 460b. For example, the Deployment Customization Manager 420b can create an association between the Application Component 150 and the Customized Application Component Property in the Database 460b, in place of an association between the Application Component 150 and the one Uncustomized Application Component Property in the database 460b.

While an example manner of implementing the system 100 is illustrated in FIGS. 1A-1C, and an example manner of implementing the blueprints 202-208 and an example manner of implementing the multimachine service 210 is illustrated in FIG. 2, and an example manner of implementing installation 300 is illustrated in FIG. 3, and an example manner of implementing virtual appliance 320, Deployment Customization Virtual Appliance 324, Deployment Customization Manager Service 420b, Deployment Event Broker 430b First and Second Deployment Customization Workflow Processors 420c, 420d and Catalog Item Customization or Modification Database 460b is illustrated in FIGS. 4A-4F, and an example manner of operating the Deployment Customization Virtual Appliance 324 is illustrated in FIG. 5, and another example manner of operating the Deployment Customization Virtual Appliance 324 is illustrated in FIG. 6, one or more of the elements, processes and/or devices illustrated in these foregoing figures may be combined, divided, re-arranged, omitted, eliminated and/or implemented in any other way.

Further, the example application 102, 102a, the example application director 106, the example cloud provider 110, the example deployment environments 112, the example VMs 114, the example containers 114a, the example topology generator 120, the example deployment plan generator 122, the example deployment director 124, the example blueprint 126, the example deployment plans 128, the example catalog database 130, the example cloud interface 132, the example central package repository 134, the example blueprint display 135, the example cloud manager 138, the example blueprint manager 140, the example distributed execution managers 146A, 146B, the example application component 150, the example approver designation 156, the example Customization level 158, the example visual depiction of application component 160, and/or, more generally, the example system 100 of FIGS. 1A-1C may be implemented by hardware, software, firmware and/or any combination of hardware, software and/or firmware.

Thus, for example, any of the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example blueprint display 135 the example cloud manager 138, the example blueprint manager 140, the example distributed execution managers 146A, 146B, the example application component 150, the example approver designation 156, the example Customization level 158, the example visual depiction of application component 160, and/or, more generally, the example system 100 of FIGS. 1A-1C could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, the example blueprints 202, 206, 208, the example servers 210A, 210B, 210C, and/or, more generally, the example multi-machine blueprints of FIG. 2 may be implemented by hardware, software, firmware and/or any combination of hardware, software and/or firmware. Thus, for example, any of the example blueprints 202, 206, 208, the example servers 210A, 210B, 210C, and/or, more generally, the example multi-machine blueprints of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, the example load balancer 310, the example Virtual Appliances 320, 322, the example Deployment Customization Virtual Appliance 324, the example Component Servers 330a-336a, 330b-336b, the example Management Endpoints 340-344, the example Management Agents 350a-356a, 350b-356b and/or, more generally, the example installation 300 of FIG. 3 may be implemented by hardware, software, firmware and/or any combination of hardware, software and/or firmware. Thus, for example, any of the example load balancer 310, the example Virtual Appliances 320, 322, the example Deployment Customization Virtual Appliance 324, the example Component Servers 330a-336a, 330b-336b, the example Management Endpoints 340-344, the example Management Agents 350a-356a, 350b-356b and/or, more generally, the example installation 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, the example Application Component 150, example Uncustomized Application Component Properties 154a, example Customized or Modified Application Component Properties 154b, example Uncustomized Machine Name 156a, example Customized or Modified Machine Name 156b, example Uncustomized IP Address 158a, example Customized or Modified IP Address 158b, example Customized Resource Allocation 159a, example Customized or Modified Resource Allocation 159b, example Service Provisioner 410b, example Deployment Customization Manager Service 420b, example Deployment Customization Event Record 422, example Deployment Customization Event Information 423, example Deployment Customization Event Notification Generator 424, example Deployment Customization Timer 425, example Deployment Customization Processor 426), example First and Second Deployment Customization Workflow Processors 420c,420d (example First Deployment Customization Workflow Communications Manager 427a, example First Deployment Customization Workflow Execution Unit 428a, example First Deployment Customization Workflow 429a, example Second Deployment Customization Workflow Communications Manager 427b, example Second Deployment Customization Workflow Execution Unit 428b, example Second Deployment Customization Workflow 429b, example Deployment Event Broker 430b, example Deployment Event Subscription Manager 431, example Deployment Customization Topic Hierarchical Registry 432, example Registration of a First Blocking Subscription 432a, example Registration of a Second Blocking Subscription 432b, example Registration of Non-Blocking Subscriptions 432c, example Deployment Customization Topic 433 and example Deployment Customization Schema 434), example Authentication Provider 440b, example Proxy 450b and example Catalog Item Customization or Modification Database 460b and/or, more generally, example Virtual Appliance 320 and example Deployment Customization Virtual Appliance 324 of FIGS. 4A-4F may be implemented by hardware, software, firmware and/or any combination of hardware, software and/or firmware.

Thus, for example, any of the example Application Component 150, example Uncustomized Application Component Properties 154a, example Customized or Modified Application Component Properties 154b, example Uncustomized Machine Name 156a, example Customized or Modified Machine Name 156b, example Uncustomized IP Address 158a, example Customized or Modified IP Address 158b, example Customized Resource Allocation 159a, example Customized or Modified Resource Allocation 159b, example Service Provisioner 410b, example Deployment Customization Manager Service 420b, example Deployment Customization Event Record 422, example Deployment Customization Event Information 423, example Deployment Customization Event Notification Generator 424, example Deployment Customization Timer 425, example Deployment Customization Processor 426), example First and Second Deployment Customization Workflow Processors 420c,420d (example First Deployment Customization Workflow Communications Manager 427a, example First Deployment Customization Workflow Execution Unit 428a, example First Deployment Customization Workflow 429a, example Second Deployment Customization Workflow Communications Manager 427b, example Second Deployment Customization Workflow Execution Unit 428b, example Second Deployment Customization Workflow 429b, example Deployment Event Broker 430b, example Deployment Event Subscription Manager 431, example Deployment Customization Topic Hierarchical Registry 432, example Registration of a First Blocking Subscription 432a, example Registration of a Second Blocking Subscription 432b, example Registration of Non-Blocking Subscriptions 432c, example Deployment Customization Topic 433 and example Deployment Customization Schema 434, example Authentication Provider 440b, example Proxy 450b and example Catalog Item Customization or Modification Database 460b and/or, more generally, example Virtual Appliance 320 and example Deployment Customization Virtual Appliance 324 of FIGS. 4A-4F could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, example Deployment Customization Manager Service 420b, example Deployment Event Broker 430b, example First Deployment Customization Workflow Processor 420c, example Second Deployment Customization Workflow Processor 420d, example Third Consumer 530, example Fourth Consumer 540, example Fifth Consumer 550, example Consume First Deployment Customization Event Notification 501, example Publish First Deployment Customization Event Notification 502, example Reply-Back with Second Deployment Customization Event Notification 503, example Publish Second Deployment Customization Event Notification 504, example Reply-Back with Third Deployment Customization Event Notification 505, example Publish Third Deployment Customization Event Notification 506 and example Reply-Back with Third Deployment Customization Notification 507 and/or example manner of operating the Deployment Customization Virtual appliance 324 as in FIG. 5 may be implemented by hardware, software, firmware and/or any combination of hardware, software and/or firmware. Thus, for example, any of the example Deployment Customization Manager Service 420b, example Deployment Event Broker 430b, example First Deployment Customization Workflow Processor 420c, example Second Deployment Customization Workflow Processor 420d, example Third Consumer 530, example Fourth Consumer 540, example Fifth Consumer 550, example Consume First Deployment Customization Event Notification 501, example Publish First Deployment Customization Event Notification 502, example Reply-Back with Second Deployment Customization Event Notification 503, example Publish Second Deployment Customization Event Notification 504, example Reply-Back with Third Deployment Customization Event Notification 505, example Publish Third Deployment Customization Event Notification 506 and example Reply-Back with Third Deployment Customization Notification 507 and/or the example manner of operating the Deployment Customization Virtual 324 as in FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further, example Deployment Customization Manager Service 420b, example Deployment Event Broker 430b, example First Deployment Customization Workflow Processor 420c, example Second Consumer 620, example Third Consumer 630, example Fourth Consumer 640, example Consume First Deployment Customization Event Notification 601, example Publish First Deployment Customization Event Notification 602, example Reply-Back with Second Deployment Customization Event Notification, example Publish Second Deployment Customization Event Notification 604 and example Reply-Back with Second Deployment Customization Notification 605 and/or the additional example manner of operating the Deployment Customization Virtual Appliance 324 as in FIG. 6 may be implemented by hardware, software, firmware and/or any combination of hardware, software and/or firmware.

Thus, for example, any of the example Deployment Customization Manager Service 420b, example Deployment Event Broker 430b, example First Deployment Customization Workflow Processor 420c, example Second Consumer 620, example Third Consumer 630, example Fourth Consumer 640, example Consume First Deployment Customization Event Notification 601, example Publish First Deployment Customization Event Notification 602, example Reply-Back with Second Deployment Customization Event Notification, example Publish Second Deployment Customization Event Notification 604 and example Reply-Back with Second Deployment Customization Notification 605 and/or the additional example manner of operating the Deployment Customization Virtual Appliance as in FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s))).

When reading any of the apparatus or system claims of this patent to cover a purely software and/or firmware implementation, at least one of the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example blueprint display 135 the example cloud manager 138, the example blueprint manager 140, the example distributed execution managers 146A, 146B, the example application component 150, the example approver designation 156, the example Customization level 158, the example visual depiction of application component 160, example blueprints 202, 206, 208, the example servers 210A, 210B, 210C, and/or, more generally, the example multi-machine blueprints of FIG. 2 may be implemented by hardware, software, firmware and/or any combination of hardware, software and/or firmware. Thus, for example, any of the example blueprints 202, 206, 208, the example servers 210A, 210B, 210C, example load balancer 310, the example Virtual Appliances 320, 322, the example Deployment Customization Virtual Appliance 324, the example Component Servers 330a-336a, 330b-336b, the example Management Endpoints 340-344, the example Management Agents 350a-356a, 350b-356b and/or, more generally, the example installation 300 of FIG. 3 may be implemented by hardware, software, firmware and/or any combination of hardware, software and/or firmware. Thus, for example, any of the example load balancer 310, the example Virtual Appliances 320, 322, the example Deployment Customization Virtual Appliance 324, the example Component Servers 330a-336a, 330b-336b, the example Management Endpoints 340-344, the example Management Agents 350a-356a, 350b-356b, example Application Component 150, example Uncustomized Application Component Properties 154a, example Customized or Modified Application Component Properties 154b, example Uncustomized Machine Name 156a, example Customized or Modified Machine Name 156b, example Uncustomized IP Address 158a, example Customized or Modified IP Address 158b, example Customized Resource Allocation 159a, example Customized or Modified Resource Allocation 159b, example Service Provisioner 410b, example Deployment Customization Manager Service 420b, example Deployment Customization Event Record 422, example Deployment Customization Event Information 423, example Deployment Customization Event Notification Generator 424, example Deployment Customization Timer 425, example Deployment Customization Processor 426), example First and Second Deployment Customization Workflow Processors 420c,420d (example First Deployment Customization Workflow Communications Manager 427a, example First Deployment Customization Workflow Execution Unit 428a, example First Deployment Customization Workflow 429a, example Second Deployment Customization Workflow Communications Manager 427b, example Second Deployment Customization Workflow Execution Unit 428b, example Second Deployment Customization Workflow 429b, example Deployment Event Broker 430b, example Deployment Event Subscription Manager 431, example Deployment Customization Topic Hierarchical Registry 432, example Registration of a First Blocking Subscription 432a, example Registration of a Second Blocking Subscription 432b, example Registration of Non-Blocking Subscriptions 432c, example Deployment Customization Topic 433 and example Deployment Customization Schema 434, example Authentication Provider 440b, example Proxy 450b and example Catalog Item Customization or Modification Database 460b and/or, more generally, example Virtual Appliance 320 and example Deployment Customization Virtual Appliance 324 of FIGS. 4A-4F, and example Deployment Customization Manager Service 420b, example Deployment Event Broker 430b, example First Deployment Customization Workflow Processor 420c, example Second Deployment Customization Workflow Processor 420d, example Third Consumer 530, example Fourth Consumer 540, example Fifth Consumer 550, example Consume First Deployment Customization Event Notification 501, example Publish First Deployment Customization Event Notification 502, example Reply-Back with Second Deployment Customization Event Notification 503, example Publish Second Deployment Customization Event Notification 504, example Reply-Back with Third Deployment Customization Event Notification 505, example Publish Third Deployment Customization Event Notification 506 and example Reply-Back with Third Deployment Customization Notification 507 and/or the example manner of operating the Deployment Customization Virtual Appliance 324 as in FIG. 5 and example Deployment Customization Manager Service 420b, example Deployment Event Broker 430b, example First Deployment Customization Workflow Processor 420c, example Second Consumer 620, example Third Consumer 630, example Fourth Consumer 640, example Consume First Deployment Customization Event Notification 601, example Publish First Deployment Customization Event Notification 602, example Reply-Back with Second Deployment Customization Event Notification, example Publish Second Deployment Customization Event Notification 604 and example Reply-Back with Second Deployment Customization Notification 605 and/or the additional example manner of operating the Deployment Customization Virtual Appliance and in FIG. 6 is/are hereby expressly defined to include a tangible computer readable storage device or storage disk such as a memory, a digital versatile disk (DVD), a compact disk (CD), a Blu-ray disk, etc. storing the software and/or firmware.

Further still, the example system 100 of FIGS. 1A-1C, and the example blueprints 202-208 and the example multimachine service 210 of FIG. 2, and the example installation 300 of FIG. 3, and the example virtual appliance 320 and the example deployment Customization virtual appliance 324, the example Deployment Customization Manager Service 420b and the example deployment event broker 430b of FIGS. 4A-4F, and the example manner of operating the Deployment Customization Virtual Appliance 324 as in FIG. 5 and the example deployment customization event notifications occurring in the context of the example Deployment Customization Virtual Appliance 324 as in FIG. 5, and the additional example manner of operating the Deployment Customization Virtual Appliance 324 as in FIG. 6 and the additional example deployment customization event notifications occurring in the context of the example Deployment Customization Virtual Appliance 324 may include one or more elements, processes and/or devices in addition to, or instead of, those illustrated in these foregoing figures, and/or may include more than one of any or all of the illustrated elements, processes and devices.

Figure 7A:
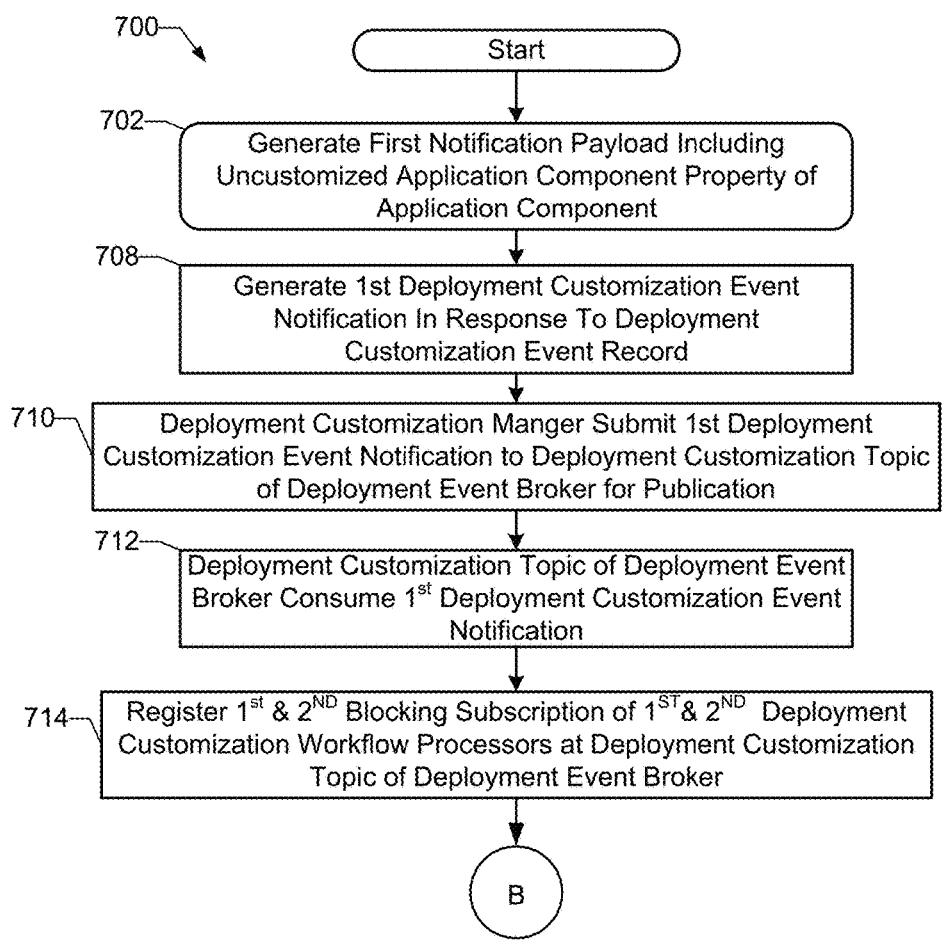
FIGS. 7A-7D is a flowchart representative of example of machine readable instructions which may be executed to implement an example Deployment Customization Virtual Appliance of FIGS. 4B-4F to manage deployment customization of an application for deployment in an application deployment environment of a cloud computing platform provider.
Figure 7B:
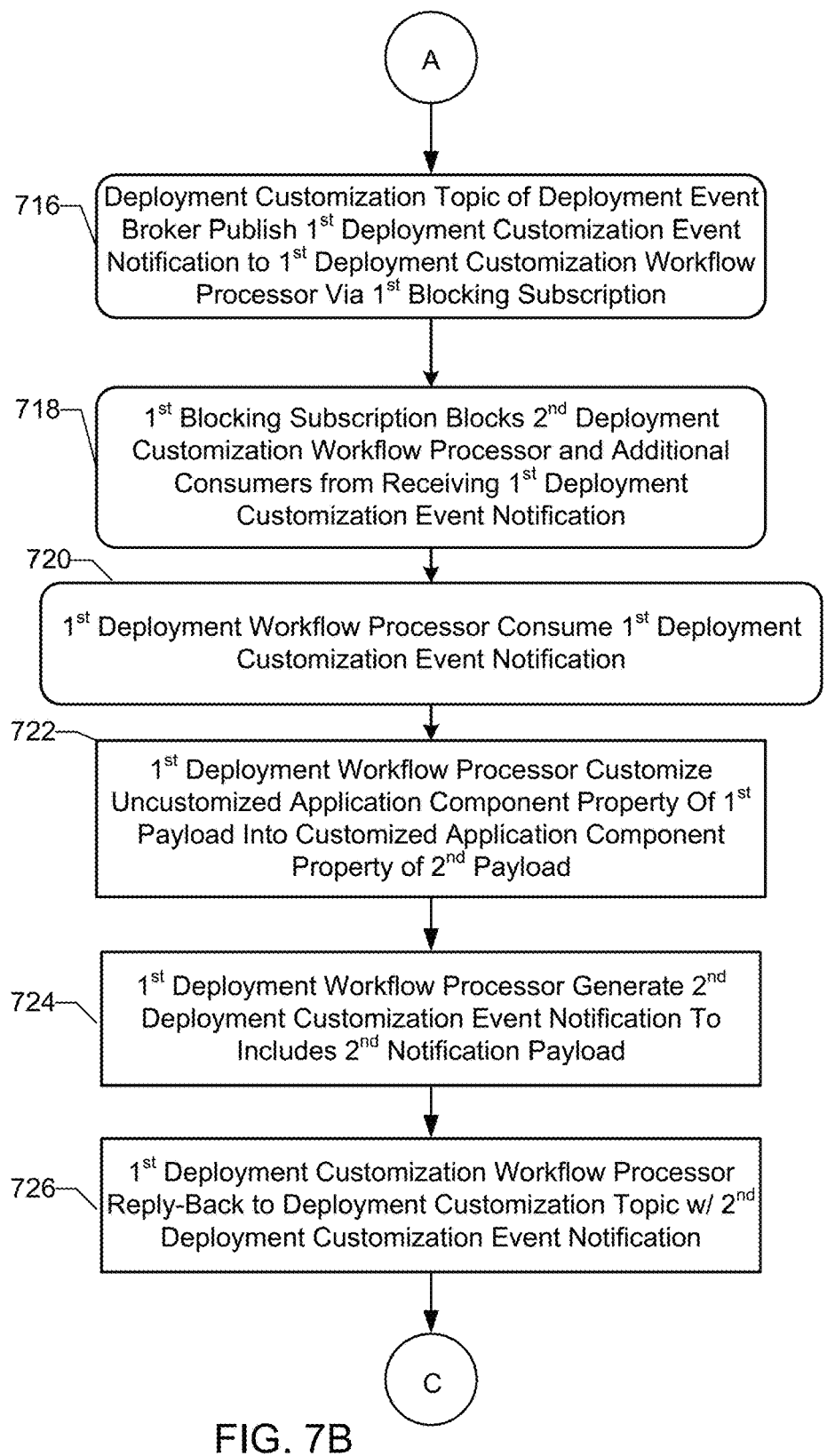
Figure 7C:
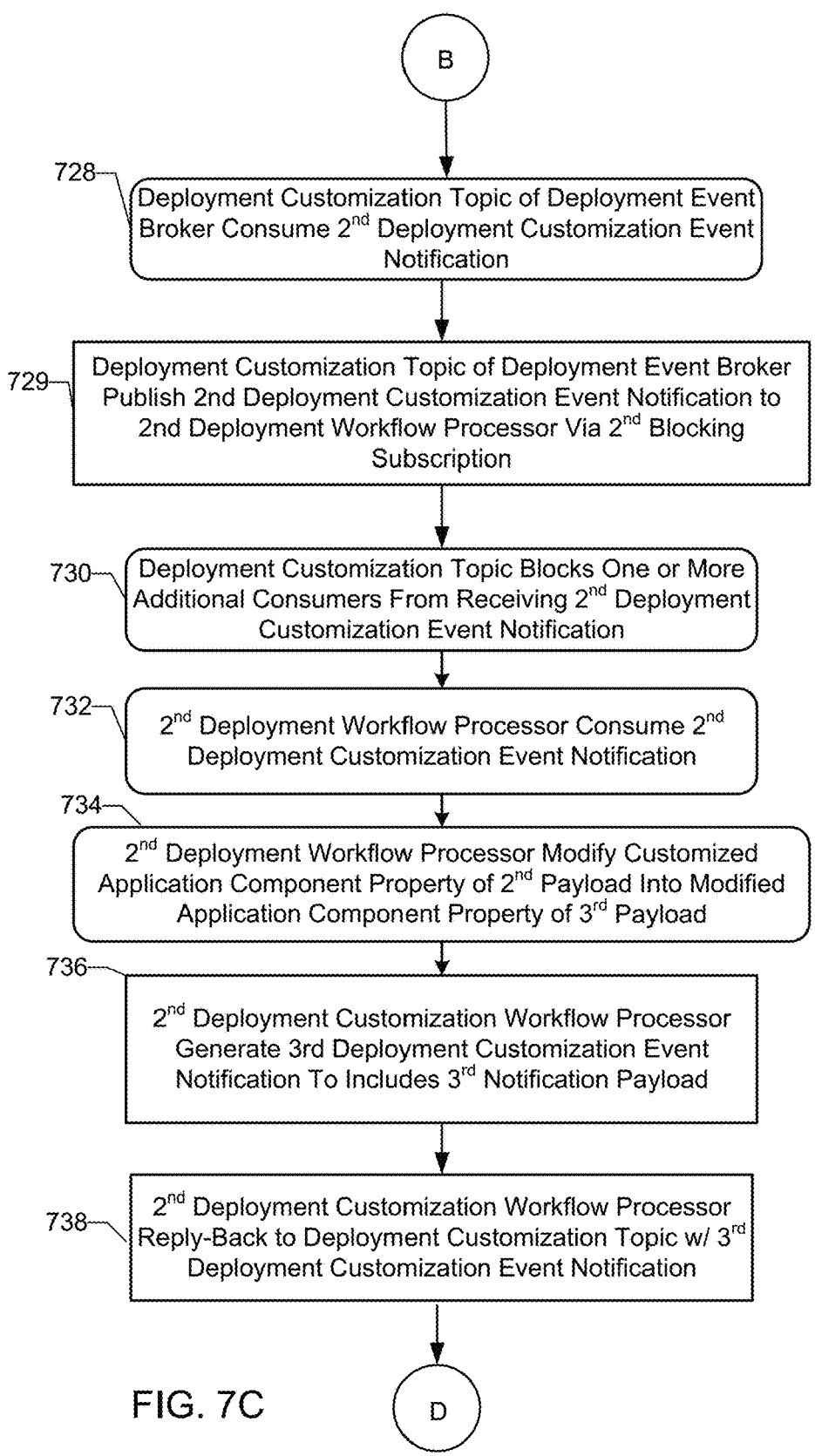
Figure 7D:
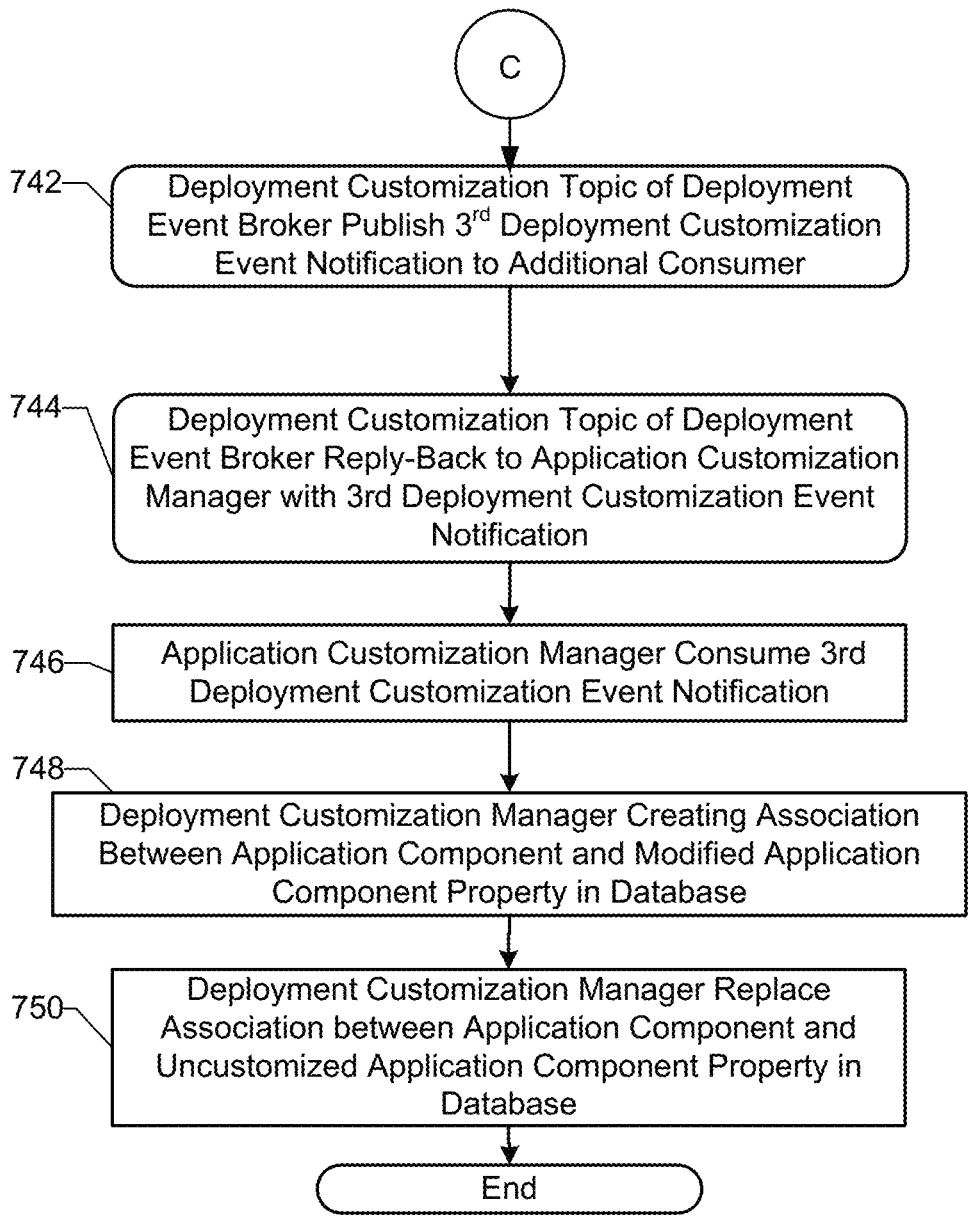
Figure 8A:
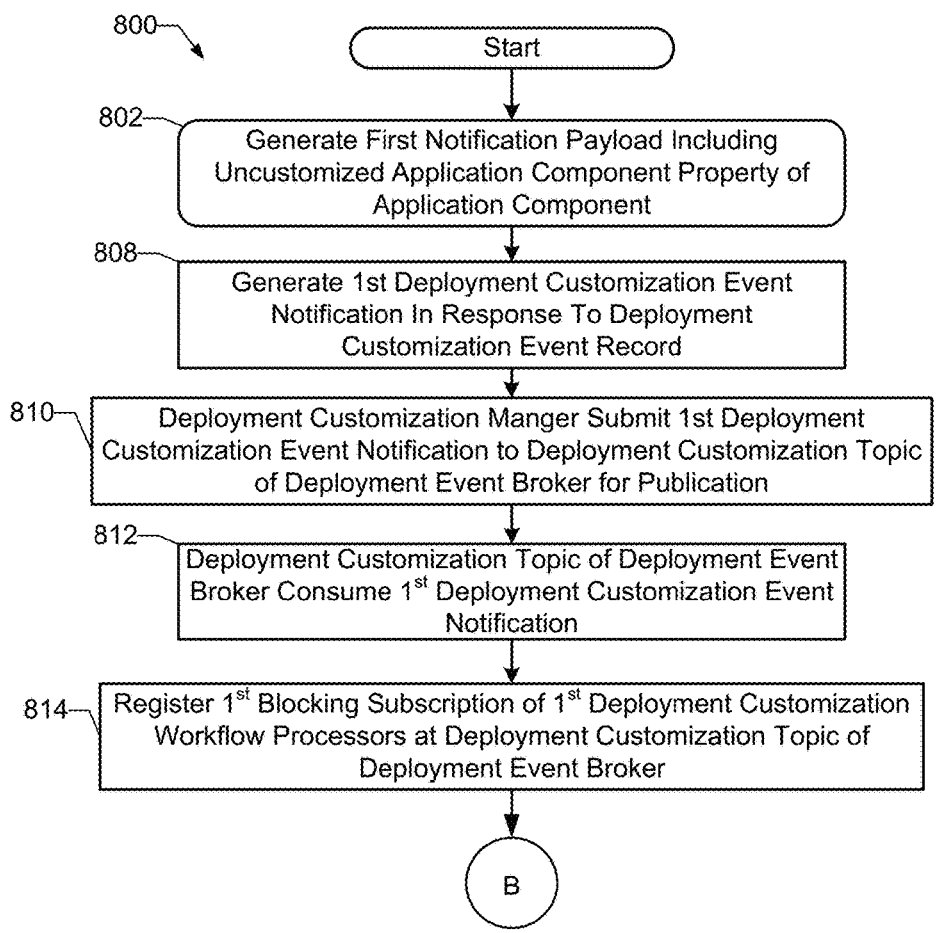
FIGS. 8A-8C is a flowchart representative of example of machine readable instructions which may be executed to implement another example Deployment Customization Virtual Appliance of FIGS. 4B-4F to manage deployment customization of an application for deployment in an application deployment environment of a cloud computing platform provider.
Figure 8B:
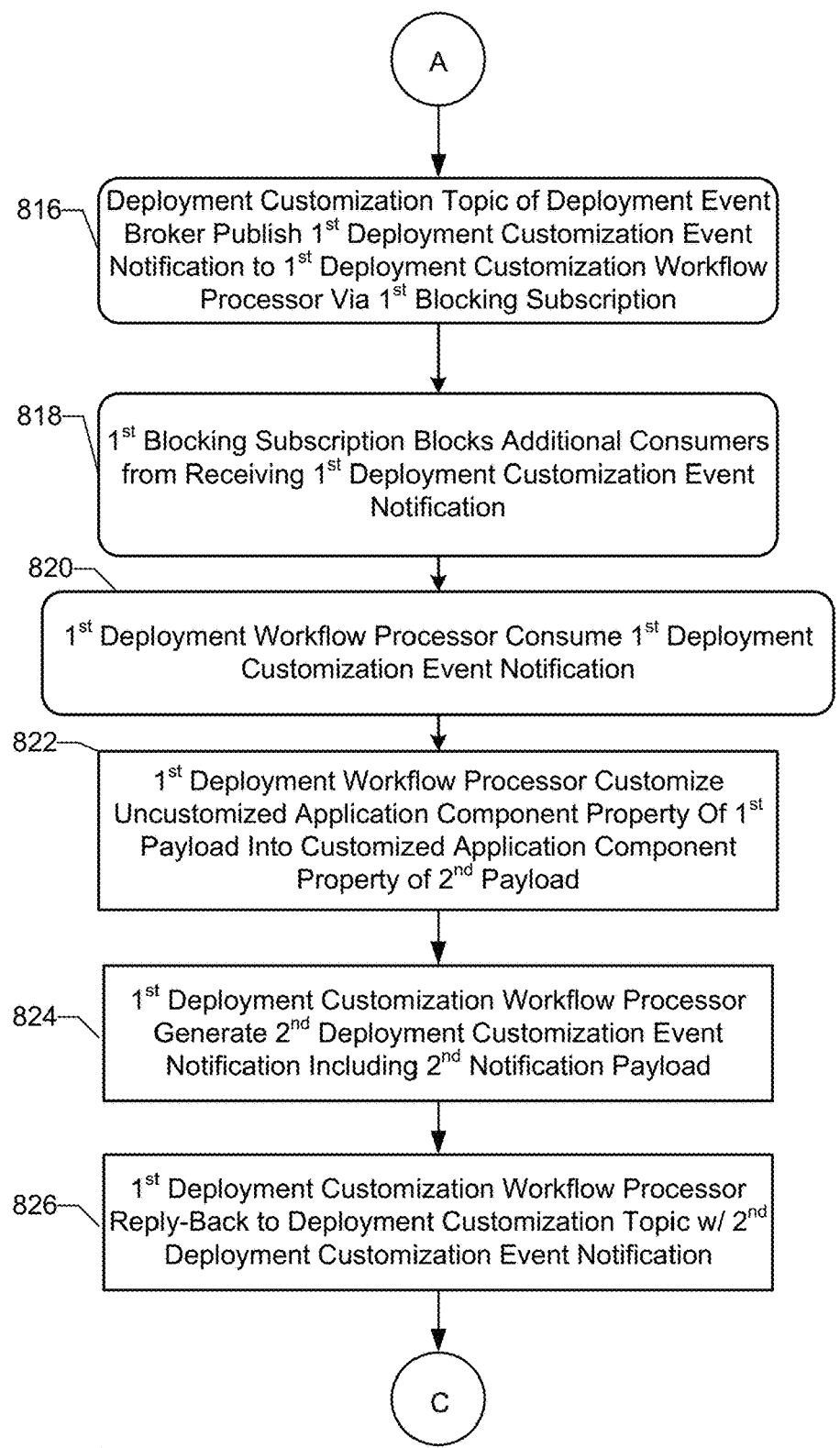
Figure 8C:
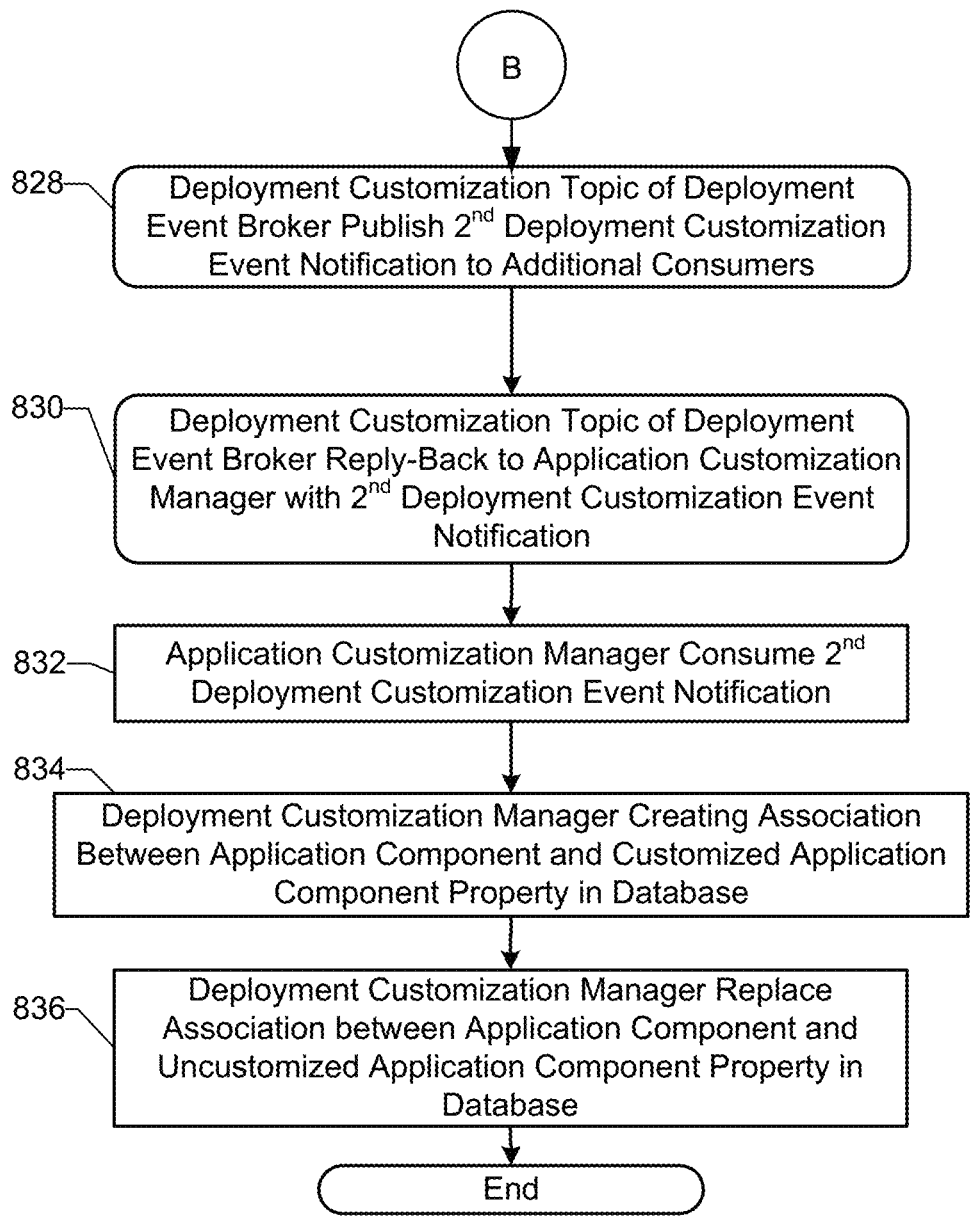

Example flowcharts representative of example machine readable instructions which may be executed to implement the example Deployment Customization Virtual Appliance of FIGS. 4A-4F to manage deployment customization of an application for deployment in an application deployment environment of a cloud computing platform provider are shown in the flowchart of FIGS. 7A-7D and in the flowchart of FIGS. 8A-8C.

In these examples, the machine readable instructions implement programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowchart illustrated in FIGS. 7A-7D and the flowchart illustrated in FIGS. 8A-8C, many other methods of managing customizations in accordance with the teachings of this disclosure may alternatively be used. For example, the order of execution of the blocks may be changed, and/or some of the blocks described may be changed, eliminated, or combined.

As mentioned above, the example processes of FIGS. 7A-7D and FIGS. 8A-8C may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 6A-6C may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

A first flowchart representative of example machine readable instructions which may be executed to implement the example Deployment Customization Virtual Appliance of FIGS. 4A-4F to manage deployment customization of an application for deployment in an application deployment environment of a cloud computing platform provider are shown in FIGS. 7A-7D.

FIGS. 7A-7D depict a first flowchart representative of computer readable instructions that may be executed to implement the example Deployment Customization Virtual Appliance of FIGS. 4A-4F to manage deployment Customization of an application for deployment in an application deployment environment of a cloud computing platform provider. An example program 700 is illustrated beginning in FIG. 7A. Initially at block 702, a first notification payload including an Uncustomized Application Component Property of the Application Component is generated the Deployment Customization Manager Service. For example, Uncustomized Application Component Properties 154a are associated with the Application Component 150 in a database 460b. For example, a catalog database item can be an Application Component 150. Uncustomized Application Component Properties 154a can be associated with the Application Component 150, as shown as included in the database Catalog 130 of FIGS. 1B and 1n the Catalog Item Customization or Modification Database 460b of FIG. 4F. The Deployment Customization Manager Service 420b is associated with Uncustomized Application Component Properties. For example, the Deployment Customization Manager Service 420b in the example of FIG. 4B (and shown in greater detail in the example of FIG. 4C) can be associated with the Uncustomized Application Component Properties 154a in the Catalog Item Customization or Modification Database 460b. The Deployment Customization Manager Service 420b can generate a First Notification Payload including an Uncustomized Application Component Property. In some examples a plurality of Uncustomized Application Component Properties 154a can be included in the First Notification Payload. The Uncustomized Application Component Property of the First Notification Payload can include at least one of the Uncustomized Machine Name 156a, the reservation for the Uncustomized Internet Protocol (IP) Address 158a, and the Uncustomized Resource Allocation 159a. The Uncustomized Resource Allocation 159a can be broadly directed to examples such as uncustomized Central Processing Unit (CPU) allocation for VM's, and uncustomized memory allocation for VM's, etc.

In the example of FIG. 7A, a First Deployment Customization Event Notification is generated in response to a Deployment Customization Event Record (block 708). For example, the Deployment Customization Manager Service 420b can include a Deployment Customization Event Record 422 that records Deployment Customization Event information 423 about the Deployment Customization Event Occurrence. For example, the Deployment Customization Manager Service 420b can include a Deployment Customization Event Record 422 that records Deployment Customization Event information 423 about the user requesting the Application Component 150. For example, the Deployment Customization Manager Service 420 can include a Deployment Customization Processor 426 to process the Deployment Customization Event Information, and can further include a Deployment Customization Event Notification Generator 424. The Deployment Customization Event Notification Generator 424 of the Deployment Customization Manager 420b can generate the first Deployment Customization Event Notification in response to the Deployment Customization Event Record 422 that records Deployment Customization Event Information 423 about a deployment customization event occurrence. The first deployment Customization event notification can include Deployment Customization Event Information 423, and in particular includes the First Notification Payload, including an Uncustomized Application Component Property. In some examples a plurality of Uncustomized Application Component Properties 154a can be included in the First Notification Payload. The first deployment event notification can also include a serialized form of at least a portion of the Deployment Customization Event Record 422 that records the Deployment Customization Event Information 423 about the deployment event occurrence.

In the example of FIG. 7A, in accordance with flowchart of example program 700, the Deployment Customization Manager submits the First Deployment Customization Event Notification to the Deployment Customization Topic of the Deployment Event Broker for publication (block 710). The Deployment Customization Topic of the Deployment Event Broker consumes the First Deployment Customization Notification (block 712.) For example, The Deployment Customization Event Notification Generator 424 of the Deployment Customization Manager Service 420b can send the First Deployment Customization Event Notification to the Deployment Event Broker 430b. Authentication provider 440b can authenticate access to the Deployment Event Broker 430b. The Deployment Customization Event Broker 430b can comprises a scalable distributed service. The Deployment Customization Manager Service 420b can start the Deployment Customization Timer 425 running, when the Deployment Customization Manager Service 420b sends the First Deployment Customization Event Notification to the Deployment Event Broker 430b. The Deployment Customization Manager Service 420b can wait, for a predetermined period of time as indicated using the Deployment Customization Timer 425, for a responsive event notification (e.g. a reply-back) from the Deployment Event Broker 430b. For example, if the predetermined time period is 24 hours, then the Deployment Customization Manager Service 420b can wait for 24 hours for a reply-back from the Deployment Event Broker 430b. If the Deployment Customization Manager Service 420b receives no reply-back from the Deployment Event Broker 430b within the predetermined time period as indicated by the Deployment Customization Timer 425, then the Deployment Customization Manager Service 420b can notify the user.

In the example of FIG. 7A, in accordance with flowchart of example program 700, First and Second Blocking Subscriptions of the First and Second Deployment Customization Workflow Processors are registered at the Deployment Customization Topic of the Deployment Event Broker (block 714.) For example, the Deployment Event Broker 430b shown in FIG. 4B, and shown in greater detail in FIG. 4D can include a Deployment Event Subscription Manager 431, a Deployment Customization Topic Registry 432, a Deployment Customization Topic 433. The Deployment Customization Topic 433 can include a Deployment Customization Schema 434. The Deployment Customization Topic Registry 432 can be hierarchical, so as provide the Deployment Customization Topic Hierarchical Registry 432 (or the Hierarchical Registry 432 of the Deployment Customization Topic 433.) The Deployment Customization Topic Hierarchical Registry 432 can provide for a hierarchical registry of subscriptions to the Deployment Customization Topic 433. For example: superior in the hierarchy of the Hierarchical Registry 432 can be a first blocking subscription 432a of the first customization workflow processor 420c; and a first subordinate in the hierarchy of the Hierarchical Registry 432 can be a second blocking subscription 432b of the second customization workflow processor 420d. Accordingly, in the hierarchy of the Hierarchical Registry 432, the second blocking subscription 432b of the second customization workflow processor 420d is subordinate to the first blocking subscription 432a of the first customization workflow processor 420c. Although not shown in the example of FIG. 4D, in other examples of the Hierarchical Registry 432 can include a second subordinate in the hierarchy of the Hierarchical Registry 432, which can be a third blocking subscription of a third customization workflow processor. Similarly, in other examples, the Hierarchical Registry 432 can include a third subordinate in the hierarchy of the Hierarchical Registry, which can be a fourth blocking subscription of a fourth customization workflow processor, and so on. In the example shown in FIG. 4D, further subordinate in the hierarchy of the Hierarchical Registry 432 can be non-blocking subscriptions 432c of one or more additional consumers. As a general matter, workflow processors, such as the First and Second Customization Workflow Processors 420c, 420d, as well as the one or more additional consumers each register their respective subscriptions at the Hierarchical Registry 432 of the Deployment Event Broker 430b to receive notifications published by the Deployment Customization Topic 433. However, since the First and Second Customization Workflow Processors 420c, 420d are blocking consumers, each having respective First and Second Blocking Subscriptions 431, 432, registered at the Hierarchical Registry 432 of the Deployment Event Broker 430b, notifications are published in an ordered sequence according to the hierarchy of the Hierarchical Registry 432. For example, the ordered sequence according to the hierarchy of the Hierarchical Registry 432 can be as follows. First, 501 consume, via the Deployment Event Broker 430b, the First Deployment Customization Event Notification, when the Deployment Customization Manager Service 420b sends the First Deployment Customization Event Notification to the Deployment Event Broker 430b. Next, 502 publish according the hierarchy, via the Deployment Customization Topic 433 of the Deployment Event Broker 430b, the First Deployment Customization Event Notification to the First Customization Workflow Processor 420c, while the First Blocking Subscription 432a blocks the Second Customization Workflow Processor 420d and the one or more additional consumers from receiving the First Deployment Customization Event Notification from the Deployment Customization Topic 433 (and while the First Blocking Subscription 432a blocks the Second Customization Workflow Processor 420d and the one or more additional consumers from receiving any notification from the Deployment Customization Topic 433, until after the First Customization Workflow Processor 420c replies back to the Deployment Customization Topic 433 with a Second Deployment Customization Event Notification.) Next, 503 reply-back, via the First Customization Workflow Processor 420c, with the Second Deployment Customization Event Notification to the Deployment Customization Topic 433. Next, 504 publish according to the hierarchy, via Deployment Customization Topic 433 of the Deployment Event Broker 430b, the Second Deployment Customization Event Notification to the second Customization Workflow Processor 420d, while the Second Blocking Subscription 432b blocks the one or more additional consumers from receiving the Second Deployment Customization Event Notification from the Deployment Customization Topic 433 (and while the Second Blocking Subscription 432*b* blocks the one or more additional consumers from receiving any notification from the Deployment Customization Topic 433, until after the Second Customization Workflow Processor 420*d* replies back to the Deployment Customization Topic 433 with a third Deployment Customization Event Notification.) Next, 505 reply-back, via the Second Customization Workflow Processor 420*d*, with the Third Deployment Customization Event Notification to the Deployment Customization Topic 433. Next, 506 publish according to the hierarchy, via Deployment Customization Topic 433 of the Deployment Event Broker 430*b*, the third Deployment Customization Event Notification to the additional consumers. Next, 507 reply-back, via Deployment Customization Topic 433 of the Deployment Event Broker 430*b*, with the third Deployment Customization Event Notification to the Deployment Customization Manager Service 420*b*. As discussed, according to the hierarchy of the Hierarchical Registry 432 of the Deployment Customization Topic 433, the Second Blocking Subscription 432*b* can be subordinate to the First Blocking Subscription 432*a*, so that blocking associated with the Second Deployment Customization Workflow Processor 420*d* is subordinate to blocking associated with the First Deployment Customization Workflow Processor 420*c*. It should also be noted that the example Deployment Customization Topic 433 of the Deployment Event Broker 430*b* can be a repliable topic. For example: 503 reply-back, via the First Customization Workflow Processor 420*c*, with the Second Deployment Customization Event Notification to the Deployment Customization Topic 433; 505 reply-back, via the Second Customization Workflow Processor 420*d*, with the Third Deployment Customization Event Notification to the Deployment Customization Topic 433; and 507 reply-back, via Deployment Customization Topic 433 of the Deployment Event Broker 430*b*, with the third Deployment Customization Event Notification to the Deployment Customization Manager Service 420*b*. Accordingly, in light of all of the foregoing, it should be understood that in this example the First Blocking Subscription 432*a* of the First Deployment Customization Workflow Processor 420*c* can be registered at the Hierarchical Registry 432 of the Deployment Customization Topic 433 to provide for the First Deployment Customization Workflow Processor 420*c* receiving The First Deployment Customization Event Notification 501 from the Deployment Customization Topic 433. The Second Blocking Subscription 432*b* of the Second Deployment Customization Workflow Processor 420*d* can likewise be registered at the Hierarchical Registry 432 of the Deployment Customization Topic 433. The First Subscription 432*a* of the First Customization Workflow Processor can be a First Blocking Subscription 432*a* and is registered at the Deployment Customization Topic 433 to block the Second Deployment Customization Workflow Processor 420*d* from receiving the First Deployment Customization Event Notification 501. One or more additional non-blocking subscriptions 432*c*, each corresponding to a respective one or more additional non=blocking consumers 530, 540, 550, 620, 630, 640, are registered at the deployment customization topic 433. The First Subscription 432*a* of the First Customization Workflow Processor 420*c* is A First Blocking Subscription 432*a* and is registered at the Hierarchical Registry 432 of the Deployment Customization Topic 433 to block the one or more additional consumers 530, 540, 550, 620, 630, 640, from receiving the First Deployment Customization Event Notification 501 from the Deployment Customization Topic 433. Moreover, in light of all of the foregoing, it should be understood that in this example the First Subscription 432*a* of the First Customization Workflow Processor 420*c* can be a First Blocking Subscription 432*a* and can be registered at the Hierarchical Registry 432 of the Deployment Customization Topic 433 to block the one or more additional consumers 530, 540, 550, 620, 630, 640 from receiving any Deployment Customization Event Notification until after the First Deployment Customization Workflow Processor 420*c* is to reply back to the Deployment Customization Topic 433 with the Second Deployment Event Notification. The First Subscription 432*a* of the First Deployment Customization Workflow Processor 420*c* can be a First Blocking Subscription 432*a* and can be registered at the Hierarchical Registry 432 of the Deployment Customization Topic 433 to block the Second Deployment Customization Workflow Processor 420*d* from receiving any Deployment Customization Event Notification until after the First Deployment Customization Workflow Processor 420*c* is to reply-back to the Deployment Customization Topic 433 with the second deployment event notification. The Second Subscription 432*b* of the Second Deployment Customization Workflow Processor 420*d* can be registered at the Deployment Customization Topic 433 so as to provide for the Second Deployment Customization Workflow Processor 420*d* receiving the Second Deployment Customization Event Notification 503 from the deployment customization topic 433. The Second Subscription 432*b* of the Second Customization Workflow Processor can be a Second Blocking Subscription 432*b* and can be registered at the Hierarchical Registry 432 of the Deployment Customization Topic 433 to block the one or more additional consumers 530, 540, 550, 620, 630, 640 from receiving any deployment customization event notification until after the Second Deployment Customization Workflow Processor 420*d* is to reply-back to the Deployment Customization Topic 433 with the Third Deployment Customization Notification. For example, Third and fourth subscriptions each corresponding to a respective third and fourth non-blocking consumer can be registered at the Hierarchical Registry 432 of the Deployment Customization Topic 433. The Second Subscription 432*b* of the Second Deployment Customization Workflow Processor 420*d* can be a Second Blocking Subscription 432*b* and can be registered at the Hierarchical Registry 432 of the Deployment Customization Topic 433 to block the third and fourth non-blocking consumers from receiving any deployment customization event notification until after the Second Deployment Customization Workflow Processor 420*d* replies-back to the Deployment Customization Topic 433 with the Third Deployment Event Notification.

In the example of FIG. 7B, in accordance with flowchart of example program 700, the Deployment Customization Topic of the Deployment Event Broker publishes the First Deployment Customization Event Notification to the First Deployment Customization Workflow Processor, via the First Blocking Subscription of the First Deployment Customization Workflow Processor (block 716.) The First Blocking subscription blocks the Second Deployment Customization Workflow Processor and Additional Consumers from receiving the First Deployment Customization Event Notification (block 718.) For example, the Deployment Customization Topic 433 of the Deployment Event Broker 430*b* publishes 502, according the hierarchy of the Hierarchical Registry 432, the First Deployment Customization Event Notification to the First Customization Workflow Processor 420*c*, while the First Blocking Subscription 432*a* blocks the Second Customization Workflow Processor 420*d* and the one or more additional consumers from receiving the First Deployment Customization Event Notification from the Deployment Customization Topic 433 (and while the First Blocking Subscription 432a blocks the Second Customization Workflow Processor 420d and the one or more additional consumers from receiving any notification from the Deployment Customization Topic 433, until after the First Customization Workflow Processor 420c replies back to the Deployment Customization Topic 433 with a Second Deployment Customization Event Notification.)

In the example of FIG. 7B, and in accordance with flowchart of example program 700, the First Deployment Workflow Processor consumes the First Deployment Customization Event Notification (block 720.) The First Deployment Workflow Processor customizes the Uncustomized Application Component Property of the First Payload into Customized Application Component Property of the Second Payload (block 722.) For example, Examples of the First and Second Deployment Customization Workflow Processors 420c, 420d shown in FIG. 4B are shown in greater detail in FIG. 4E. In the example of FIG. 4E, the First Deployment Customization Workflow Processor 420c can include a First Deployment Customization Workflow Communications Manager 427a to manage communications with the First Deployment Customization Workflow Processors 420c. Additionally, the First Deployment Customization Workflow Processor 420c can include a First Deployment Customization Workflow Execution Unit 428a to process the First Deployment Customization Workflow 429a. For example, as mentioned previously, the Deployment Customization Topic 433 of the Deployment Event Broker 430b can publish the First Deployment Customization Event Notification to the First Customization Workflow Processor 420c. In response, the First Customization Workflow Processor 420c can: consume the First Deployment Customization Event Notification (including the First Notification Payload); customize the First Notification Payload into the Second Notification Payload; and reply-back to the Deployment Customization Topic 433 of the Deployment Event Broker 430b with the Second Deployment Customization Event Notification (including the Second Notification Payload.). More particularly, the First Deployment Customization Event Notification can include the First Notification Payload, which can include the Uncustomized Application Component Property. For example the Uncustomized Application Component Property can be the plurality of Uncustomized Application Component Properties 154a. The First Deployment Customization Workflow Processor 420c can process the First Deployment Customization Workflow 429a to customize the Uncustomized Application Component Property (or the plurality Uncustomized Application Component Properties 154a) of the First Notification Payload into Customized Application Component Property (or the Customized Application Component Properties 154b of the Second Notification Payload.) As mentioned previously, the Uncustomized Application Component Properties 154a, for example can include an Uncustomized Machine Name 156a, a reservation for an Uncustomized Internet Protocol (IP) Address 158a, and an Uncustomized Resource Allocation 159a. As mentioned previously, the forgoing are related to VM's. For example, the Uncustomized Resource Allocation 159a can be broadly directed to examples such as Uncustomized Central Processing Unit (CPU) Allocation for VM's, and Uncustomized Memory Allocation for VM's, etc. For example, at least one of the Uncustomized Application Component Properties 154a of the First Notification Payload can be customized by the First Deployment Customization Workflow Processor 420c into at least one of the Customized Application Component Properties 154b of the Second Notification Payload. More particularly, for example, the Uncustomized Virtual Machine Name 156a (for example "foo-machine-name") of the First Notification Payload can be customized into the Customized Virtual Machine Name 156b (for example "my-foo-machine-name") of the Second Notification Payload. For example, the Uncustomized Virtual Machine Internet Protocol (IP) Address Reservation 158a (for example "198.111.111") can be customized into the Customized Virtual Machine Internet Protocol (IP) Address Reservation 158b (for example "198.999.999"). Similarly, for example, at least one Uncustomized Virtual Machine Resource Allocation 159a of the First Notification Payload can be customized by the First Deployment Customization Workflow Processor 420c into at least one Customized Virtual Machine Resource Allocation 159b of the Second Notification Payload. For example, the Uncustomized Virtual Machine Memory Allocation (for example "4 Gigabytes of Memory") of the First Notification Payload can be customized into the Customized Virtual Machine Memory Allocation (for example "2 Gigabytes of Memory") of the Second Notification Payload. For example, the Uncustomized Central Processing Unit (CPU) Allocation (for example "4 CPUs") of the First Notification Payload can be customized into the Customized Central Processing Unit (CPU) Allocation (for example "2 CPU's") of the Second Notification Payload. For avoidance of doubt, it should be understood the forgoing are just some examples, and various other examples can likewise be implemented in accordance with this disclosure. For example, Second Notification Payload can include a mix that can include an Uncustomized Application Component Property in addition to the Customized Application Component Property. For example, the Second Notification Payload can include the Uncustomized Virtual Machine Name 156 (for example "foo-machine-name") and Uncustomized Virtual Machine Internet Protocol (IP) Address Reservation 158a (for example "198.111.111") in a mix along with the Customized Virtual Machine Memory Allocation (for example "2 Gigabytes of Memory") and along with the Customized Central Processing Unit (CPU) Allocation (for example "2 CPU's")

In the example of FIG. 7B, in accordance with flowchart of example program 700, the First Deployment Workflow Processor generates the Second Deployment Customization Event Notification to include the Second Notification Payload (block 724.) For example, the First Deployment Customization Workflow Processor 420c can generate the Second Deployment Customization Event Notification that includes the Second Notification Payload, which includes the a Customized Application Component Property.

The First Deployment Customization Workflow Processor replies-back to the Deployment Customization Topic with the Second Deployment Customization Event Notification (block 726.) The Deployment Customization Topic of the Deployment Event Broker consumes the Second Deployment Customization Event Notification (block 728.) For example, the First Deployment Customization Workflow Processor 420c can reply-back to the Deployment Customization Topic 433 with the Second Deployment Customization Event Notification 503 that includes the Second Notification Payload, which includes the Customized Application Component Property.

The Deployment Customization Topic of the Deployment Event Broker publishes the Second Deployment Customization Event Notification to the Second Deployment Workflow Processor, via the Second Blocking Subscription of the Second Deployment Customization Workflow Processor (block 729.) For example, at a point in time after First Deployment Customization Workflow Processor 420c replies-back to the Deployment Customization Topic 433 with the Second Deployment Customization Event Notification, the Deployment Customization Topic 433 can publish to the Second Deployment Customization Workflow Processor 420d the Second Deployment Customization Event Notification. For example, the Second Deployment Customization Event Notification can include the Second Notification Payload, which can include the Customized Application Component Property.

The Deployment Customization Topic blocks the Additional Consumer from receiving the Second Deployment Customization Event notification (block 730.) For example, the Deployment Customization Topic 433 of the Deployment Event Broker 430b can publish 504, according to the hierarchy of the Hierarchical Registry 432, the Second Deployment Customization Event Notification to the Second Customization Workflow Processor 420d, while the Second Blocking Subscription 432b blocks the additional consumers from receiving the Second Deployment Customization Event Notification from the Deployment Customization Topic 433 (and while the Second Blocking Subscription 432b blocks the additional consumers from receiving any notification from the Deployment Customization Topic 433, until after the Second Customization Workflow Processor 420d replies back to the Deployment Customization Topic 433 with a third Deployment Customization Event Notification.)

In the example of FIG. 7C, in accordance with flowchart of example program 700, the Second Deployment Customization Workflow Processor consumes the Second Deployment Customization Event Notification (block 732.) The Second Deployment Workflow Processor modifies the Customized Application Component Properties of the Second Payload into Modified Application Component Properties of the Third Payload (block 734.) The Second Deployment Customization Workflow Processor generates a Third Deployment Customization Event Notification to include the Third Notification Payload (block 736.) The Second Deployment Customization Workflow Processor replies-back to the Deployment Customization Topic with the Third Deployment Customization Event Notification (block 738.) For example, the Second Customization Workflow Processor 420d can: consume the Second Deployment Customization Event Notification (including the Second Notification Payload); modify the Second Notification Payload into the Third Notification Payload; and reply-back to the Deployment Customization Topic 433 of the Deployment Event Broker 430b with the Third Deployment Customization Event Notification (including the Third Notification Payload.). For example, the Third Notification Payload can include a Customized Application Component Property in addition to the Modified Application Component Property. Moreover, for example, the Third Notification Payload can include the Uncustomized Application Component Property in addition to the Customized Application Component Properties and in addition to the Modified Application Component Property. In various examples, in accordance with this disclosure, at least one of the Uncustomized Application Component Properties 154a and/or at least one of the Customized Application Component Properties 154b of the Second Notification Payload can be modified by the Second Deployment Customization Workflow Processor 420d into at least one of the Modified Application Component Properties 154b of the Third Notification Payload. More particularly, for example, the Uncustomized Virtual Machine Name 156a (for example "foo-machine-name") or the Customized Virtual Machine Name 156b (for example "my-foo-machine-name") of the Second Notification Payload can be modified into the Modified Virtual Machine Name 156b (for example "my-own-foo-machine-name") of the Third Notification Payload. For example, the Uncustomized Virtual Machine Internet Protocol (IP) Address Reservation 158a (for example "198.111.111") or the Customized Virtual Machine Internet Protocol (IP) Address Reservation 158b (for example "198.999.999") of the Second Notification Payload can be modified into the Modified Virtual Machine Internet Protocol (IP) Address Reservation 158b (for example "198.999.001"). Similarly, for example, at least one Uncustomized Virtual Machine Resource Allocation 159a and/or at least one Customized Virtual Machine Resource Allocation 159b of the First Notification Payload of the Second Notification Payload can be modified by the Second Deployment Customization Workflow Processor 420d into at least one Modified Virtual Machine Resource Allocation 159b of the Third Notification Payload. For example, the Uncustomized Virtual Machine Memory Allocation (for example "4 Gigabytes of Memory") or the Customized Virtual Machine Memory Allocation (for example "2 Gigabytes of Memory") of the Second Notification Payload can be modified into the Modified Virtual Machine Memory Allocation (for example "1 Gigabyte of Memory") of the Third Notification Payload. For example, the Uncustomized Central Processing Unit (CPU) Allocation (for example "4 CPUs") or the Customized Central Processing Unit (CPU) Allocation (for example "2 CPU's") of the Second Notification Payload can be modified into the Modified Central Processing Unit (CPU) Allocation (for example "1 CPU") of the Third Notification Payload. For avoidance of doubt, it should be understood the forgoing are just some examples, and various other examples can likewise be implemented in accordance with this disclosure. For example, it should be understood that the Third Notification Payload can include a mix that includes an Uncustomized Application Component Property in addition to the Customized Application Component Property in addition to Modified Application Component Properties 154 b. For example, the Third Notification Payload can include the Uncustomized Virtual Machine Name 156 (for example "foo-machine-name") and Modified Virtual Machine Internet Protocol (IP) Address Reservation 158a (for example "198.999.001") along with the Customized Virtual Machine Memory Allocation (for example "2 Gigabytes of Memory") and along with the Modified Central Processing Unit (CPU) Allocation (for example "1 CPU's"). For example, as illustrated by the foregoing, the Uncustomized Virtual Machine Name 156 (for example "foo-machine-name") of the First Notification Payload can remain uncustomized as the Uncustomized Virtual Machine Name 156 (for example "foo-machine-name") in the Second Notification Payload, and further can remain unmodified as the Uncustomized Virtual Machine Name 156 (for example "foo-machine-name") in the Third Notification Payload. Accordingly, for example, at least one of the Uncustomized Application Component Properties 154a of the First Notification Payload can remain uncustomized as an Uncustomized Application Component Property 154a in the Second Notification Payload, and further can remain unmodified as the Uncustomized Application Component Property 154a in the Third Notification Payload. For example, as illustrated by the foregoing, the Uncustomized Virtual Machine Internet Protocol (IP) Address Reservation 158a (for example "198.111.111") of the First Notification Payload, can remain as the Uncustomized Virtual Machine Internet Protocol (IP) Address Reservation 158a (for example "198.111.111") in the Second Notification Payload, but then can be modified to the Modified Virtual Machine Internet Protocol (IP) Address Reservation 158a (for example "198.999.001") in the Third Notification Payload. Accordingly, for example, at least one of the Uncustomized Application Component Properties 154a of the First Notification Payload can remain uncustomized as an Uncustomized Application Component Property 154a in the Second Notification Payload, but can be modified into the Modified Application Component Property 154b in the Third Notification Payload. For example, as illustrated by the foregoing, the Uncustomized Virtual Machine Memory Allocation (for example "4 Gigabytes of Memory") of the First Notification Payload can be customized to the Customized Virtual Machine Memory Allocation (for example "2 Gigabytes of Memory") in the Second Notification Payload, and can remain unmodified so as to be the Customized Virtual Machine Memory Allocation (for example "2 Gigabytes of Memory") in the Third Notification Payload. Accordingly, for example, at least one of the Uncustomized Application Component Properties 154a of the First Notification Payload can be customized into the Customized Application Component Property 154b in the Second Notification Payload, and can remain unmodified so as to be the Customized Application Component Property 154b in the Third Notification Payload. For example, as illustrated by the foregoing, the Uncustomized Central Processing Unit (CPU) Allocation (for example "4 CPUs") of the First Notification Payload can be customized into the Customized Central Processing Unit (CPU) Allocation (for example "2 CPU's") of the Second Notification Payload, and then can be modified into the Modified Central Processing Unit (CPU) Allocation (for example "1 CPU") of the Third Notification Payload. Accordingly, for example, at least one of the Uncustomized Application Component Properties 154a of the First Notification Payload can be customized into the Customized Application Component Property 154b in the Second Notification Payload, and further can be modified into the Modified Application Component Property 154b in the Third Notification Payload. For example, the Second Deployment Customization Workflow Processor 420d can generate the Third Deployment Customization Event Notification that includes the Third Notification Payload, which includes the Modified Application Component Property. For example, the Second Deployment Customization Workflow Processor 420d can reply-back to the Deployment Customization Topic 433 with the Third Deployment Customization Event Notification that includes the Third Notification Payload, which includes the Modified Application Component Property. For example, the Second Deployment Customization Workflow Processor 420d can modify the application component properties (e.g. an Uncustomized Application Component Property and/or the Customized Application Component Properties) of the Second Notification Payload into a Modified Application Component Property 154b of the Third Notification Payload. For example, a Modified Application Component Property of the Third Notification Payload can include at least one of: a Modified Virtual Machine Name 156b, a Modified Virtual Machine Internet Protocol (IP) Address Reservation 158b, and a Modified Virtual Machine Resource Allocation 150 9b, a Modified Virtual Machine Memory Allocation and a Modified Central Processing Unit (CPU) Allocation. For example, the Second Deployment Customization Workflow Processor 420d can generate the Third Deployment Customization Event Notification 505 that can include the Third Notification Payload, which can include the Modified Application Component Property. For example, the Second Deployment Customization Workflow Processor 420d can reply-back to the Deployment Customization Topic 433 with the Third Deployment Customization Event Notification 505 that can include the Third Notification Payload, which can include the Modified Application Component Property.

In the example of FIG. 7D, in accordance with flowchart of example program 700, the Deployment Customization Topic of the Deployment Event Broker publishes the Third Deployment Customization Event Notification to an Additional Consumer (block 742.) For example, after the Second Deployment Customization Workflow Processor 420d replies-back to the deployment customization topic 433, the deployment customization topic 433 can publish to a third consumer the third deployment customization event notification 506 that includes the third notification payload, which includes the modified application component property. For example, after the Second Deployment Customization Workflow Processor 420d replies back to the Deployment Customization Topic 433, the Deployment Customization Topic 433 can publish to third and/or fourth and/or fifth consumers 530, 540, 550 the Third Deployment Customization Event Notification 506 that can include the Third Notification Payload, which can include the Modified Application Component Property.

In the example of FIG. 7D, in accordance with flowchart of example program 700, the Deployment Customization Topic of the Deployment Event Broker replies-back to the Application Customization Manager with the Third Deployment Customization Event Notification (block 744.) For example, after the Second Deployment Customization Workflow Processor 420d replies-back to the Deployment Customization Topic 433, the Deployment Customization Topic 433 can reply back to the Deployment Customization Manager 420b with the Third Deployment Customization Event Notification 505 that can include the Third Notification Payload, which can include the Modified Application Component Property.

In the example of FIG. 7D, in accordance with flowchart of example program 700, the Application Customization Manager consumes the Third Deployment Customization Event Notification (block 746.) The Deployment Customization Manager creates an association between the Application Component and Modified Application Component Property in the database (block 748.) The Deployment Customization Manager replaces the association between the Application Component and Uncustomized Application Component Property in the database (block 750.) For example, the deployment customization manager 420b can associate the Application Component 150 with the Modified Application Component Property in the database 460b. For example, the deployment customization manager 420b can create an association between the Application Component 150 and the Modified Application Component Property in the database 460b, in place of an association between the Application Component 150 and the Uncustomized Application Component Property in the database 460b. After executing block 750, execution of example program 700 can end.

Another flowchart representative of example machine readable instructions which may be executed to implement another example Deployment Customization Virtual Appliance of FIGS. 4A-4F to manage deployment customization of an application for deployment in an application deployment environment of a cloud computing platform provider is shown in FIGS. 8A-8C.

FIGS. 8A-8C depict another flowchart representative of computer readable instructions that may be executed to implement the example Deployment Customization Virtual Appliance of FIGS. 4A-4F to manage deployment Customization of an application for deployment in an application deployment environment of a cloud computing platform provider. An example program 800 is illustrated beginning in FIG. 8A. Initially at block 802, a first notification payload including an Uncustomized Application Component Property of the Application Component is generated the Deployment Customization Manager Service. For example, Uncustomized Application Component Properties 154a are associated with the Application Component 150 in a database 460b. For example, a catalog database item can be an Application Component 150. Uncustomized Application Component Properties 154a can be associated with the Application Component 150, as shown as included in the database Catalog 130 of FIGS. 1B and 1n the Catalog Item Customization or Modification Database 460b of FIG. 4F. The Deployment Customization Manager Service 420b is associated with Uncustomized Application Component Properties. For example, the Deployment Customization Manager Service 420b in the example of FIG. 4B (and shown in greater detail in the example of FIG. 4C) can be associated with the Uncustomized Application Component Properties 154a in the Catalog Item Customization or Modification Database 460b. The Deployment Customization Manager Service 420b can generate a First Notification Payload including an Uncustomized Application Component Property. In some examples a plurality of Uncustomized Application Component Properties 154a can be included in the First Notification Payload. The Uncustomized Application Component Property of the First Notification Payload can include at least one of the Uncustomized Machine Name 156a, the reservation for the Uncustomized Internet Protocol (IP) Address 158a, and the Uncustomized Resource Allocation 159a. The Uncustomized Resource Allocation 159a can be broadly directed to examples such as uncustomized Central Processing Unit (CPU) allocation for VM's, and uncustomized memory allocation for VM's, etc.

In the example of FIG. 8A, a First Deployment Customization Event Notification is generated in response to a Deployment Customization Event Record (block 808). For example, the Deployment Customization Manager Service 420b can include a Deployment Customization Event Record 422 that records Deployment Customization Event information 423 about the Deployment Customization Event Occurrence. For example, the Deployment Customization Manager Service 420b can include a Deployment Customization Event Record 422 that records Deployment Customization Event information 423 about the user requesting the Application Component 150. For example, the Deployment Customization Manager Service 420 can include a Deployment Customization Processor 426 to process the Deployment Customization Event Information, and can further include a Deployment Customization Event Notification Generator 424. The Deployment Customization Event Notification Generator 424 of the Deployment Customization Manager 420b can generate the First Deployment Customization Event Notification in response to the Deployment Customization Event Record 422 that records Deployment Customization Event Information 423 about a deployment customization event occurrence. The First deployment Customization event notification can include Deployment Customization Event Information 423, and in particular includes the First Notification Payload, including an Uncustomized Application Component Property. In some examples a plurality of Uncustomized Application Component Properties 154a can be included in the First Notification Payload. The first deployment event notification can also include a serialized form of at least a portion of the Deployment Customization Event Record 422 that records the Deployment Customization Event Information 423 about the deployment event occurrence.

In the example of FIG. 8A, in accordance with flowchart of example program 800, the Deployment Customization Manager submits the First Deployment Customization Event Notification to the Deployment Customization Topic of the Deployment Event Broker for publication (block 810). The Deployment Customization Topic of the Deployment Event Broker consumes the First Deployment Customization Notification (block 812.) For example, The Deployment Customization Event Notification Generator 424 of the Deployment Customization Manager Service 420b can send the First Deployment Customization Event Notification to the Deployment Event Broker 430b. Authentication provider 440b can authenticate access to the Deployment Event Broker 430b. The Deployment Customization Event Broker 430b can comprises a scalable distributed service. The Deployment Customization Manager Service 420b can start the Deployment Customization Timer 425 running, when the Deployment Customization Manager Service 420b sends the First Deployment Customization Event Notification to the Deployment Event Broker 430b. The Deployment Customization Manager Service 420b can wait, for a predetermined period of time as indicated using the Deployment Customization Timer 425, for a responsive event notification (e.g. a reply-back) from the Deployment Event Broker 430b. For example, if the predetermined time period is 24 hours, then the Deployment Customization Manager Service 420b can wait for 24 hours a reply-back from the Deployment Event Broker 430b. If the Deployment Customization Manager Service 420b receives no reply-back from the Deployment Event Broker 430b within the predetermined time period as indicated by the Deployment Customization Timer 425, then the Deployment Customization Manager Service 420b can notify the user.

In the example of FIG. 8A, in accordance with flowchart of example program 800, First Blocking Subscription of the First Deployment Customization Workflow Processor is registered at the Deployment Customization Topic of the Deployment Event Broker (block 814.) For example, the Deployment Event Broker 430b shown in FIG. 4B, and shown in greater detail in the example of FIG. 4D, can include a Deployment Event Subscription Manager 431, a Deployment Customization Topic Registry 432, a Deployment Customization Topic 433. The Deployment Customization Topic 433 can include a Deployment Customization Schema 434. The Deployment Customization Topic Registry 432 can be hierarchical, so as provide the Deployment Customization Topic Hierarchical Registry 432 (or the Hierarchical Registry 432 of the Deployment Customization Topic 433.) The Deployment Customization Topic Hierarchical Registry 432 can provide for a hierarchical registry of subscriptions to the Deployment Customization Topic 433. For example: superior in the hierarchy of the Hierarchical Registry 432 can be a first blocking subscription 432a of the first customization workflow processor 420c. In the example shown in FIG. 4D, further subordinate in the hierarchy of the Hierarchical Registry 432 can be non-blocking subscriptions 432c of additional consumers. As a general matter, the First Customization Workflow Processors 420c as well as the additional consumers can register their respective subscriptions at the Hierarchical Registry 432 of the Deployment Event Broker 430b to receive notifications published by the Deployment Customization Topic 433. However, since the First Customization Workflow Processors 420c is a blocking consumer, having a First Blocking Subscription 431 registered at the Hierarchical Registry 432 of the Deployment Event Broker 430b, notifications are published in an ordered sequence according to the hierarchy of the Hierarchical Registry 432. For example, the ordered sequence according to the hierarchy of the Hierarchical Registry 432 can be as follows. first, 601 consume, via the Deployment Event Broker 430b, the First Deployment Customization Event Notification (including the First Notification Payload), when the Deployment Customization Manager Service 420b sends the First Deployment Customization Event Notification (including the First Notification Payload) to the Deployment Event Broker 430b. Next, 602 publish according the hierarchy, via the Deployment Customization Topic 433 of the Deployment Event Broker 430b, the First Deployment Customization Event Notification (including the First Notification Payload) to the First Customization Workflow Processor 420c, while the First Blocking Subscription 432a can block the additional consumer from receiving the First Deployment Customization Event Notification from the Deployment Customization Topic 433 (and while the First Blocking Subscription 432a blocks the additional consumer from receiving any notification from the Deployment Customization Topic 433, until after the First Customization Workflow Processor 420c replies back to the Deployment Customization Topic 433 with a Second Deployment Customization Event Notification.) Next, 603 reply-back, via the First Customization Workflow Processor 420c, with the Second Deployment Customization Event Notification (including the Second Notification Payload) to the Deployment Customization Topic 433. Next, 604 publish according to the hierarchy, via Deployment Customization Topic 433 of the Deployment Event Broker 430b, the Second Deployment Customization Event Notification (including the Second Notification Payload) to the additional consumers. Next, 605 reply-back, via Deployment Customization Topic 433 of the Deployment Event Broker 430b, with the Second Deployment Customization Event Notification (including the Second Notification Payload) to the Deployment Customization Manager Service 420b. Accordingly, in light of all of the foregoing, it should be understood that in this example the First Blocking Subscription 432a of the First Deployment Customization Workflow Processor 420c can be registered at the Hierarchical Registry 432 of the Deployment Customization Topic 433 to provide for the First Deployment Customization Workflow Processor 420c receiving The First Deployment Customization Event Notification 501 from the Deployment Customization Topic 433. Additional non-blocking subscriptions 432c, for example, corresponding to respective additional non-blocking consumers 620, 630, 640, are registered at the deployment customization topic 433. The First Subscription 432a of the First Customization Workflow Processor 420c is a First Blocking Subscription 432a and is registered at the Hierarchical Registry 432 of the Deployment Customization Topic 433 to block additional consumers 530, 540, 550, 620, 630, 640, from receiving the First Deployment Customization Event Notification 501 from the Deployment Customization Topic 433. Moreover, in light of all of the foregoing, it should be understood that in this example the First Subscription 432a of the First Customization Workflow Processor 420c can be a First Blocking Subscription 432a and can be registered at the Hierarchical Registry 432 of the Deployment Customization Topic 433 to block additional consumers 530, 540, 550, 620, 630, 640 from receiving any Deployment Customization Event Notification until after the First Deployment Customization Workflow Processor 420c is to reply back to the Deployment Customization Topic 433 with the Second Deployment Event Notification. For example, in various different arrangements Second and Third Non-Blocking Subscriptions each corresponding to a respective second and third non-blocking consumer can be registered at the Hierarchical Registry 432 of the Deployment Customization Topic 433.

In the example of FIG. 8B, in accordance with flowchart of example program 800, the Deployment Customization Topic of the Deployment Event Broker publishes the First Deployment Customization Event Notification to the First Deployment Customization Workflow Processor, via the First Blocking Subscription of the First Deployment Customization Workflow Processor (block 816.) The First Blocking subscription blocks Additional Consumers from receiving the First Deployment Customization Event Notification (block 818.) For example, the Deployment Customization Topic 433 of the Deployment Event Broker 430b publishes 502, according the hierarchy of the Hierarchical Registry 432, the First Deployment Customization Event Notification to the First Customization Workflow Processor 420c, while the First Blocking Subscription 432a blocks the additional consumers from receiving the First Deployment Customization Event Notification from the Deployment Customization Topic 433 (and while the First Blocking Subscription 432a blocks additional consumers from receiving any notification from the Deployment Customization Topic 433, until after the First Customization Workflow Processor 420c replies back to the Deployment Customization Topic 433 with the Second Deployment Customization Event Notification.)

In the example of FIG. 8B, in accordance with flowchart of example program 800, the First Deployment Workflow Processor consumes the First Deployment Customization Event Notification (block 820.) The First Deployment Workflow Processor customizes the Uncustomized Application Component Properties of the First Payload into Customized Application Component Properties of the Second Payload (block 822.) For example, examples of the First and Second Deployment Customization Workflow Processors 420c, 420d in the example of FIG. 4B are shown in greater detail in FIG. 4E. in the example of FIG. 4E, the First Deployment Customization Workflow Processor 420c can include a First Deployment Customization Workflow Communications Manager 427a to manage communications with the First Deployment Customization Workflow Processors 420c. Additionally, the First Deployment Customization Workflow Processor 420c can include a First Deployment Customization Workflow Execution Unit 428a to process the First Deployment Customization Workflow 429a. For example, as mentioned previously, the Deployment Customization Topic 433 of the Deployment Event Broker 430b can publish the First Deployment Customization Event Notification to the First Customization Workflow Processor 420c. In response, the First Customization Workflow Processor 420c can: consume the First Deployment Customization Event Notification (including the First Notification Payload); customize the First Notification Payload into the Second Notification Payload; and reply-back to the Deployment Customization Topic 433 of the Deployment Event Broker 430b with the Second Deployment Customization Event Notification (including the Second Notification Payload.). More particularly, the First Deployment Customization Event Notification can include the First Notification Payload, which can include the Uncustomized Application Component Property. The First Deployment Customization Workflow Processor 420c can process the First Deployment Customization Workflow 429a to customize the Uncustomized Application Component Property of the First Notification Payload into the Customized Application Component Property of the Second Notification Payload. As mentioned previously, the Uncustomized Application Component Properties 154a, for example can include an Uncustomized Machine Name 156a, a reservation for an Uncustomized Internet Protocol (IP) Address 158a, and an Uncustomized Resource Allocation 159a. As mentioned previously, the forgoing are related to VM's. For example, the Uncustomized Resource Allocation 159a can be broadly directed to examples such as Uncustomized Central Processing Unit (CPU) Allocation for VM's, and Uncustomized Memory Allocation for VM's, etc. For example, at least one of the Uncustomized Application Component Properties 154a of the First Notification Payload can be customized by the First Deployment Customization Workflow Processor 420c into at least one of the Customized Application Component Properties 154b of the Second Notification Payload. More particularly, for example, the Uncustomized Virtual Machine Name 156a (for example "foo-machine-name") of the First Notification Payload can be customized into the Customized Virtual Machine Name 156b (for example "my-foo-machine-name") of the Second Notification Payload. For example, the Uncustomized Virtual Machine Internet Protocol (IP) Address Reservation 158a (for example "198.111.111") can be customized into the Customized Virtual Machine Internet Protocol (IP) Address Reservation 158b (for example "198.999.999"). Similarly, for example, at least one Uncustomized Virtual Machine Resource Allocation 159a of the First Notification Payload can be customized by the First Deployment Customization Workflow Processor 420c into at least one Customized Virtual Machine Resource Allocation 159b of the Second Notification Payload. For example, the Uncustomized Virtual Machine Memory Allocation (for example "4 Gigabytes of Memory") of the First Notification Payload can be customized into the Customized Virtual Machine Memory Allocation (for example "2 Gigabytes of Memory") of the Second Notification Payload. For example, the Uncustomized Central Processing Unit (CPU) Allocation (for example "4 CPUs") of the First Notification Payload can be customized into the Customized Central Processing Unit (CPU) Allocation (for example "2 CPU's") of the Second Notification Payload. For avoidance of doubt, it should be understood the forgoing are just some examples, and various other examples can likewise be implemented in accordance with this disclosure. For example, it should be understood that the Second Notification Payload can include a mix that can include an Uncustomized Application Component Property in addition to a Customized Application Component Property. For example, the Second Notification Payload can include the Uncustomized Virtual Machine Name 156 (for example "foo-machine-name") and Uncustomized Virtual Machine Internet Protocol (IP) Address Reservation 158a (for example "198.111.111") in a mix along with the Customized Virtual Machine Memory Allocation (for example "2 Gigabytes of Memory") and along with the Customized Central Processing Unit (CPU) Allocation (for example "2 CPU's")

In the example of FIG. 8B, in accordance with flowchart of example program 800, the First Deployment Workflow Processor generates the Second Deployment Customization Event Notification to include the Second Notification Payload (block 824.) For example, the First Deployment Customization Workflow Processor 420c can generate the Second Deployment Customization Event Notification that includes the Second Notification Payload, which includes the Customized Application Component Property. In the example of FIG. 8B, in accordance with flowchart of example program 800, the First Deployment Customization Workflow Processor replies-back to the Deployment Customization Topic with the Second Deployment Customization Event Notification (block 826.) For example, the First Deployment Customization Workflow Processor replies-back to the Deployment Customization Topic with the Second Deployment Customization Event Notification. For example, the First Deployment Customization Workflow Processor 420c can reply-back to the Deployment Customization Topic 433 with the Second Deployment Customization Event Notification 603 that includes the Second Notification Payload, which includes the Customized Application Component Property.

In the example of FIG. 8C, in accordance with flowchart of example program 800, the Deployment Customization Topic of the Deployment Event Broker publishes the Second Deployment Customization Event Notification to an Additional Consumer (block 828.) For example, the Deployment Customization Topic 433 of the Deployment Event Broker 430b publishes 604, according to the hierarchy of the Hierarchical Registry 432, the Second Deployment Customization Event Notification (including the Second Notification Payload) to the additional consumer or additional consumers.

In the example of FIG. 8C, in accordance with flowchart of example program 800, the Deployment Customization Topic of the Deployment Event Broker replies-back to the Application Customization Manager with the Second Deployment Customization Event Notification (block 830.) The Application Customization Manager consumes the Second Deployment Customization Event Notification (block 832.) For example, the Deployment Customization Topic 433 of the Deployment Event Broker 430b can reply-back 605 with the Second Deployment Customization Event Notification (including the Second Notification Payload) to the Deployment Customization Manager Service 420b. Accordingly, in light of the foregoing discussion, and in light of what is shown in the example of FIG. 6, it should be understood that after the First Deployment Customization Workflow Processor 420c replies-back to the Deployment Customization Topic 433 with the Second Deployment Event Notification, the Deployment Customization Topic 433 can reply-back to the Deployment Customization Manager 420b with the Second Deployment Customization Event Notification that includes the Second Notification Payload, which includes the Customized Application Component Property.

The Deployment Customization Manager creates an association between the Application Component and Customized Application Component Property in the database (block 834.) The Deployment Customization Manager replaces the association between the Application Component and Uncustomized Application Component Property in the database (block 836.) For example, the Deployment Customization Manager 420b can associate the Application Component 150 with the customized application component property in the Database 460b. For example, the Deployment Customization Manager 420b can create an association between the Application Component 150 and the Customized Application Component Property in the Database 460b, in place of an association between the Application Component 150 and the Uncustomized Application Component Property in the database 460b. After executing block 836, execution of example program 800 can end.

Although the example program 700 of FIGS. 7A-7D and the example program 800 of FIGS. 8A-8C are described in connection with managing deployment customization of an application for deployment in an application deployment environment of a cloud computing platform provider, the example program 700 of FIGS. 7A-7D and the example program 800 of FIGS. 8A-8C implemented in accordance with the teachings of this disclosure can be used in a multi-user scenario in which hundreds or thousands of users obtain deployment customization from Cloud Provider 110. For example, while manually managing deployment customizations in a manual fashion for such quantities of users would be overly burdensome or near impossible within required time constraints, examples disclosed herein may be used to process deployment customizations using the operations and Deployment Customization Virtual Appliance 324 to manage deployment customizations and deploy large quantities of virtual machines 114 and/or containers 114a in an efficient and streamlined fashion without burdening and frustrating end users with long customization times to access such virtual machines 114 and/or containers 114a.

Figure 9:
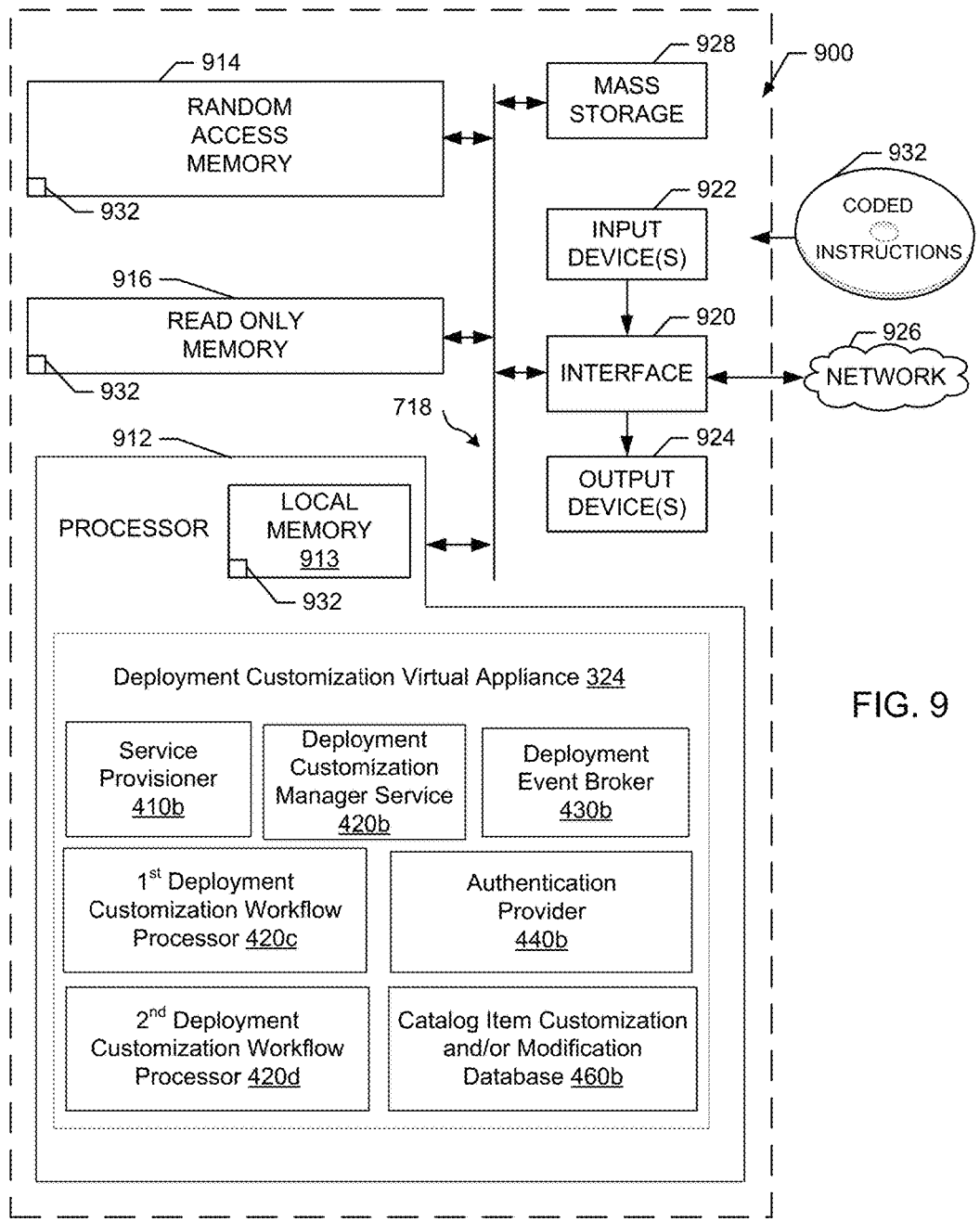
FIG. 9 is a block diagram of an example processing platform capable of executing the example machine-readable instructions of the flowchart of FIGS. 7A-7D and the flowchart of FIGS. 8A-8C to implement the example the Deployment Customization Virtual Appliance 324 of FIGS. 4B-4F.

FIG. 9 is a block diagram of an example processor platform 900 capable of executing the example machine-readable instructions of the flowchart of FIGS. 7A-7D and the flowchart of FIGS. 8A-8C to implement the example the Deployment Customization Virtual Appliance 324 of FIGS. 4B-4F. The processor platform 900 of the illustrated example includes a processor 912. The processor 912 of the illustrated example is hardware employing virtualization. For example, the processor 912 can be implemented by one or more integrated circuits, logic circuits, microprocessors or controllers from any desired family or manufacturer. As already discussed in detail previously herein, the hardware of processor 912 is virtualized using virtualization such as VMs and/or containers. In the example of FIG. 9, the Deployment Customization Virtual Appliance 324 may be implemented by one or more VM's or containers, so as to virtualize the hardware of processor 912. In the example of FIG. 9, the Deployment Customization Virtual Appliance 324 includes Service Provisioner 410b, Deployment Customization Manager Service 420b, Deployment Event Broker 430b, First Deployment Customization Workflow Processor 420c, Second Deployment Customization Workflow Processor 420d, Authentication Provider 440b and Catalog Item Customization and/or Modification Database 460b.

The processor 912 of the illustrated example includes a local memory 913 (e.g., a cache), and executes instructions to implement the example operations and management component 406 or portions thereof. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include flash devices, floppy disk drives, hard drive disks, optical compact disk (CD) drives, optical Blu-ray disk drives, RAID systems, and optical digital versatile disk (DVD) drives.

Coded instructions 932 representative of the example machine readable instructions of FIGS. 7A-7D and FIGS. 8A-8C may be stored in the mass storage device 928, in the volatile memory 914, in the non-volatile memory 916, and/or on a removable tangible computer readable storage medium such as a CD or DVD.

Copending U.S. patent application entitled "Apparatus and Methods to Incorporate External System to Approve Deployment Provisioning", filed on the same day as the present application, by Boris Savoy, Rostislav Georgiev, Lazarin Lazarov, Ventsyslav Raikov and Ivanka Baneva is hereby incorporated by reference herein in its entirety. Copending U.S. patent application entitled "Methods and Apparatus for Limiting Data Transferred Over the Network by Interpreting Part of the Data as a Metaproperty", filed on the same day as the present application, by Ventsyslav Raikov, Lazarin Lazarov, Boris Savoy and Rostislav Georgiev is hereby incorporated by reference herein in its entirety.

The various aspects, features and/or implementations as disclosed above can be used alone or in various combinations. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus comprising:
  a storage device including a database, the database including an application component to provide a logical template of an application for deployment in an appli- cation deployment environment, the application component associated with an uncustomized application component property in the database;
a processor to execute instructions that cause the processor to generate a first deployment customization event notification in response to a deployment customization event record that records deployment customization event information about a deployment customization event occurrence, the first deployment customization event notification including a first notification payload, the first notification payload including the uncustomized application component property; and
a deployment event broker having a deployment customization topic to publish the first deployment customization event notification, the deployment event broker to register a first subscription of a first deployment customization workflow processor as a blocking subscription to provide for the first deployment customization workflow processor receiving the first deployment customization event notification from the deployment customization topic and to block an additional consumer from receiving the first deployment customization event notification.

2. The apparatus as defined in claim 1, wherein the uncustomized application component property includes at least one of: an uncustomized machine name, an uncustomized machine Internet Protocol (IP) address reservation, an uncustomized machine resource allocation, an uncustomized machine memory allocation and an uncustomized Central Processing Unit (CPU) allocation.

3. The apparatus as defined in claim 1, wherein:
a second subscription of a second deployment customization workflow processor is registered at the deployment customization topic; and
the first subscription of the first deployment customization workflow processor is a first blocking subscription and is registered at the deployment customization topic to block the second deployment customization workflow processor from receiving the first deployment customization event notification.

4. The apparatus as defined in claim 1, wherein:
an additional subscription, corresponding to an additional consumer, is registered at the deployment customization topic.

5. The apparatus as defined in claim 1, wherein the first deployment customization workflow processor is to customize the uncustomized application component property of the first notification payload into a customized application component property of a second notification payload.

6. The apparatus as defined in claim 5, wherein the customized application component property of the second notification payload includes at least one of: a customized machine name, a customized machine Internet Protocol (IP) address reservation, a customized machine resource allocation, a customized machine memory allocation, or a customized Central Processing Unit (CPU) allocation.

7. The apparatus as defined in claim 5 wherein:
the deployment customization topic is repliable; and
the first deployment customization workflow processor is to reply back to the deployment customization topic with a second deployment customization event notification that includes the second notification payload, the second notification payload including the customized application component property.

8. The apparatus as defined in claim 7, wherein the processor is to associate the application component with the customized application component property in the database.

9. A method of managing properties of an application component that provides a logical template of an application for deployment in a cloud computing environment, the method comprising:
generating, by executing an instruction with at least one processor, a first notification payload including an uncustomized application component property of the application component;
generating, by executing an instruction with the at least one processor, a first deployment customization event notification that includes the first notification payload;
submitting, by executing an instruction with the at least one processor, the first deployment customization event notification to a deployment event broker for publication; and
registering, by executing an instruction with the at least one processor, a first subscription of a deployment customization workflow processor as a blocking subscription to provide for the first deployment customization workflow processor receiving the first deployment customization event notification from a deployment customization topic and to block an additional consumer from receiving the first deployment customization event notification.

10. The method as defined in claim 9, wherein the uncustomized application component property associated with the application component includes at least one of: an uncustomized machine name, an uncustomized machine Internet Protocol (IP) address reservation, an uncustomized machine resource allocation, an uncustomized machine memory allocation, or an uncustomized Central Processing Unit (CPU) allocation.

11. The method as defined in claim 10, further including publishing the first deployment customization event notification to the first deployment customization workflow processor in response to the deployment event broker consuming the first deployment customization event notification.

12. The method as defined in claim 9, further including blocking a second deployment customization workflow processor from receiving the first deployment customization event notification, based on the blocking subscription of the first deployment customization workflow processor registered with the deployment event broker.

13. The method as defined in claim 9, further including blocking an additional consumer from receiving the first deployment customization event notification, based on the blocking subscription of the first deployment customization workflow processor registered with the deployment event broker.

14. The method as defined in claim 9, further including customizing the uncustomized application component property of the first notification payload into a customized application component property of a second notification payload.

15. The method as defined in claim 14 further including generating a second deployment customization event notification including the second notification payload, the second notification payload including the customized application component property.

16. The method as defined in claim 15, further including replying back to a deployment customization topic with the second deployment customization event notification including the second notification payload, the second notification payload including the customized application component property.

17. The method as defined in claim 16, further including associating the customized application component properties with the application component.

18. A non-transitory computer readable storage medium comprising machine readable instructions which, when executed, cause a logic circuit to at least:
generate a first notification payload including an uncustomized application component property of an application component that provides a logical template of an application;
generate a first deployment customization event notification that includes the first notification payload; and
submit the first deployment customization event notification to a deployment event broker for publication; and
register a first subscription of a deployment customization workflow processor as a blocking subscription to provide for the first deployment customization workflow processor receiving the first deployment customization event notification from a deployment customization topic and to block an additional consumer from receiving the first deployment customization event notification.

19. The non-transitory computer readable storage medium as defined in claim 18 wherein the instructions are to, in response to the blocking subscription, cause the logic circuit to block an additional consumer from receiving the first deployment customization event notification.

\* \* \* \* \*